US009641366B2

(12) United States Patent
Ito

(10) Patent No.: US 9,641,366 B2
(45) Date of Patent: May 2, 2017

(54) WIRELESS COMMUNICATION DEVICE, ELECTRONIC APPARATUS, AND MOVING OBJECT

(71) Applicant: Seiko Epson Corporation, Tokyo (JP)

(72) Inventor: Hisahiro Ito, Minowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/800,125

(22) Filed: Jul. 15, 2015

(65) Prior Publication Data

US 2016/0020789 A1   Jan. 21, 2016

(30) Foreign Application Priority Data

Jul. 18, 2014   (JP) ................................. 2014-147880

(51) Int. Cl.
*H04L 27/152*   (2006.01)

(52) U.S. Cl.
CPC .................. *H04L 27/152* (2013.01)

(58) Field of Classification Search
CPC .. H04L 27/152; H04B 1/04; H04B 2001/0408
USPC ........................................................ 375/297
See application file for complete search history.

(56) References Cited

U.S. PATENT DOCUMENTS

| 2006/0211390 | A1 | 9/2006 | Uozumi et al. |
| 2007/0182613 | A1 | 8/2007 | Deguchi |
| 2009/0230486 | A1* | 9/2009 | Shimodaira ......... H03H 9/0547 257/415 |
| 2013/0057354 | A1* | 3/2013 | Yanagisawa ......... G01C 19/574 331/156 |
| 2013/0335157 | A1* | 12/2013 | Ishii .................... H01L 41/0475 331/158 |
| 2014/0077888 | A1* | 3/2014 | Iwasa ...................... H03B 5/04 331/66 |

FOREIGN PATENT DOCUMENTS

| JP | 05-243472 | A | 9/1993 |
| JP | 11-055145 | A | 2/1999 |
| JP | 2006-261714 | A | 9/2006 |
| JP | 2007-214876 | A | 8/2007 |
| JP | 2011-171956 | A | 9/2011 |
| JP | 2012-160613 | A | 8/2012 |

* cited by examiner

*Primary Examiner* — Michael Neff
(74) *Attorney, Agent, or Firm* — Harness, Dickey & Pierce, P.L.C.

(57) ABSTRACT

A wireless communication circuit includes a vibration piece, and a semiconductor device that is connected to the vibration piece in order to integrate the vibration piece and a wireless communication IC into one package and thus to produce a wireless communication device by which a high-precision oscillation frequency is obtained. The semiconductor device includes an oscillation circuit of the vibration piece, and a wireless communication circuit that has an amplifier which amplifies a wireless signal that is generated by an oscillation signal from the oscillation circuit. The vibration piece and the semiconductor device are accommodated in one package. An excitation electrode of the vibration piece is arranged in the package in such a manner that the excitation electrode is not superimposed on the amplifier when the semiconductor device is viewed from above.

18 Claims, 16 Drawing Sheets

(COMPARATIVE EXAMPLE)

WIRELESS COMMUNICATION DEVICE, ELECTRONIC APPARATUS, AND MOVING OBJECT

BACKGROUND

1. Technical Field

The present invention relates to a wireless communication device, an electronic apparatus, a moving object, and the like.

2. Related Art

For example, wireless communication is used for various intended purposes such as a wireless LAN or a portable information terminal, short-distance wireless communication, and a remote controller. The use of the wireless communication is stipulated by laws, and frequencies that are available for intended purposes, or for every country or every area, are stipulated in the laws. For this reason, there is a need to determine an oscillation frequency of a crystal vibrator or a multiplication ratio of a PLL circuit in accordance with a frequency to be used, and a carrier wave signal of a desired frequency is obtained by combining a wireless communication IC with an externally attached crystal vibrator in the related art.

As the wireless communication IC to which the crystal vibrator is externally attached, for example, disclosed in JP-A-2006-261714 is a wireless communication IC that includes an interface that connects a baseband IC, a PLL circuit that generates a carrier wave signal, and an amplifier that amplifies the carrier wave signal and drives an antenna.

In a case where a discrete IC and an externally attached crystal vibrator are combined as in the related art, it is difficult to meet the need for miniaturization or a reduction in the number of components. In order to address this problem, it is considered that a discrete wireless communication IC and a crystal vibration piece are accommodated into one package for miniaturization, but the crystal vibration piece is brought into close proximity to the wireless communication IC, and coupling occurs between an amplifier of the wireless communication IC and a crystal vibration piece or an oscillation circuit, and thus it is easy for crosstalk to occur. For this reason, a mutual bad influence occurs between the amplifier and the crystal vibration piece or the oscillation circuit. For example, as an influence of the crystal vibration piece or the oscillation circuit on the amplifier, reference leak (a digital noise) occurs. Alternatively, as an example of the influence of the amplifier on the crystal vibration piece or on the oscillation circuit, due to the noise that is generated by the amplifier, it is difficult to stabilize an oscillation frequency of a reference clock signal that is obtained by the oscillation of the crystal vibration piece and that is output from a circuit.

SUMMARY

An advantage of some aspects of the invention is to provide a wireless communication device, an electronic apparatus, and a moving object, in each of which a vibration piece and a wireless communication IC are integrated into one package and a high-precision oscillation frequency is obtained.

APPLICATION EXAMPLE 1

This application example relates to a wireless communication device that includes a vibration piece and a semiconductor device that is connected to the vibration piece, in which the semiconductor device includes an oscillation circuit of the vibration piece and a wireless communication circuit that has an amplifier that amplifies a wireless signal which is generated based on an oscillation signal from the oscillation circuit, in which the vibration piece and the semiconductor device are accommodated in one package, and in which an excitation electrode of the vibration piece is arranged in the package in such a manner that the excitation electrode is not superimposed on the amplifier of the semiconductor device when the semiconductor device is viewed from above.

With this configuration, the vibration piece and the semiconductor device can be not only integrated into one package for miniaturization, but coupling between the amplifier and the excitation electrode of the vibration piece can also be decreased. For example, reference leak or deterioration in precision of an oscillation frequency of the vibration piece can be decreased.

APPLICATION EXAMPLE 2

According to this application example, the wireless communication device may be configured such that the semiconductor device has a first outer edge, a second outer edge that faces the first outer edge, a third outer edge that extends along a direction which intersects the first outer edge and the second outer edge, and a fourth outer edge that is an outer edge that extends along a direction which intersects the first outer edge and the second outer edge and that faces the third outer edge, the wireless communication circuit includes the amplifier that is arranged in an area which is closer to the fourth outer edge than to the third outer edge, and the oscillation circuit is arranged in an area which is closer to the third outer edge than to the fourth outer edge.

With this configuration, the amplifier and the oscillation circuit that are large occurrence sources of a noise and that are output stages of an analog signal can be arranged in locations that are separated to the extent of a distance between the outer edges facing each other within the semiconductor device, and the excitation electrode of the vibration piece that is connected to the oscillation circuit can be also arranged in a location that is positioned farther. When a reference noise is coupled in the output stage, because it is impossible to remove the noise within at least the semiconductor device, the output stage is positioned a distance from the oscillation circuit and thus crosstalk is prevented. Thus, the reference leak can be decreased.

APPLICATION EXAMPLE 3

According to this application example, the wireless communication device may be configured such that, in a case where, when the semiconductor device is viewed from above, areas that result from partitioning by a first line and a second line that pass through the center of the semiconductor device and that intersect each other is defined as a first area that includes a corner at which the first outer edge and the third outer edge intersect each other, a second area that includes a corner at which the first outer edge and the fourth outer edge intersect each other, a third area that includes a corner at which the second outer edge and the third outer edge intersect each other, and a fourth area that includes a corner at which the second outer edge and the fourth outer edge intersect each other, the oscillation circuit is arranged in the third area, and the amplifier may be arranged in the second area.

The third area in which the oscillation circuit is arranged and the second area in which the amplifier is arranged are areas in which two areas are diagonally arranged among the first to fourth areas. That is, according to one aspect of the invention, the oscillation circuit and the amplifier that are the large occurrence sources of the reference leak can be arranged in locations that are positioned extremely far within the semiconductor device, and the excitation electrode of the vibration piece that is connected to the oscillation circuit can be arranged in a location that is positioned extremely far. Accordingly, the reference leak or a reduction in the precision of the oscillation frequency can be efficiently lessened.

APPLICATION EXAMPLE 4

According to this application example, the wireless communication device may be configured such that the amplifier is arranged in a first circuit area on a first outer edge side, and the oscillation circuit is arranged in a second circuit area on a second outer edge side.

APPLICATION EXAMPLE 5

According to this application example, the wireless communication device may be configured such that the semiconductor device further includes a fractional N-type PLL circuit, the fractional N-type PLL circuit includes a phase comparison circuit, a charge pump circuit, a low pass filter, a voltage control oscillator, and a fractional frequency divider, the voltage control oscillator is arranged in the first circuit area, and the phase comparison circuit, the charge pump circuit, and the fractional frequency divider are arranged in the second circuit area.

APPLICATION EXAMPLE 6

According to this application example, the wireless communication device may be configured such that the semiconductor device includes a first regulator that supplies a power source voltage for analog to the amplifier and a second regulator that supplies a power source voltage for digital to the oscillation circuit.

APPLICATION EXAMPLE 7

According to this application example, the wireless communication device may be configured such that the power source voltage for analog is supplied from the first regulator to the amplifier over a first power source line, and the power source voltage for digital is supplied from a second regulator to the oscillation circuit over the second power source line that is separated from the first power source line.

Voltage fluctuation due to an operation of the oscillation circuit occurs in the power source voltage for digital, and voltage fluctuation due to an operation of the amplifier occurs in the power source voltage for analog. In a case where the voltage fluctuation is mutually coupled to the power source voltage for analog and the power source voltage for digital, digital noise from the oscillation circuit is coupled to the amplifier and analog noise from the amplifier is coupled to the oscillation circuit. In this respect, according to the application example 6 or the application example 7, the first regulator for analog and the second regulator for digital are provided, and thus the power source voltage for analog and the power source voltage for digital are electrically separated from each other. Accordingly, the crosstalk between the oscillation circuit and the amplifier, in which the power source line is involved, can be decreased.

APPLICATION EXAMPLE 8

According to this application example, the wireless communication device may be configured such that the semiconductor device includes a first regulator that supplies a power source voltage for analog to the voltage control oscillator and the amplifier and a second regulator that supplies a power source voltage for digital to the oscillation circuit, the phase comparison circuit, the charge pump circuit, and the fractional frequency divider.

APPLICATION EXAMPLE 9

According to this application example, the wireless communication device may be configured such that the power source voltage for analog is supplied from the first regulator to the voltage control oscillator and the amplifier over a first power source line, and the power source voltage for digital is supplied from the second regulator to the oscillation circuit, the phase comparison circuit, the charge pump circuit, and the fractional frequency divider over a second power source line that is separated from the first power source line.

Because power sources for the oscillation circuit that is an occurrence source of the reference noise, the phase comparison circuit, the charge pump circuit, and the fractional frequency divider are separated as digital power sources, and the reference leak in which the power sources for the voltage control oscillator and the amplifier are involved can be decreased.

APPLICATION EXAMPLE 10

According to this application example, the wireless communication device may be configured such that the semiconductor device includes a first outer edge, a second outer edge that faces the first outer edge, a third outer edge that extends along a direction which intersects the first outer edge and the second outer edge, and in the semiconductor device, an analog pad that is connected to the amplifier may be provided along the first outer edge, and a vibration piece pad that is connected to the vibration piece may be provided along the third outer edge.

With this configuration, the vibration piece pad is arranged along the third outer edge, and thus is positioned far from the analog pad that is arranged along the first outer edge and wiring that connects the oscillation circuit and the vibration piece pad and wiring that connects the analog circuit and the analog pad are separated, thereby decreasing the crosstalk within the semiconductor device. Furthermore, the excitation electrode of the vibration piece that is connected from the pad of the oscillation circuit can be also arranged in a location that is positioned a distance away from the amplifier, and the crosstalk can be decreased.

APPLICATION EXAMPLE 11

According to this application example, the wireless communication device may be configured such that the vibration piece and the vibration piece pad are connected with a wire group and wiring within the package.

Because the vibration piece pad is arranged in the third outer edge, the wire group faces outward from the third outer edge. For this reason, the wiring within the package, which is previously connected, is positioned far from the analog pad that is arranged on the first outer edge or a first wire group for analog. In this manner, the occurrence source of the digital noise and a portion through which the analog signal passes are arranged in such a manner that the occurrence source and the portion are separated outward, and thus the crosstalk between the digital and the analog can be effectively decreased, and the excitation electrode of the vibration piece that is connected to the oscillation circuit can be arranged in a location that is positioned a distance away from the amplifier. Thus the crosstalk can be decreased.

APPLICATION EXAMPLE 12

This application example relates to an electronic apparatus including the wireless communication device described in any of the above application examples.

APPLICATION EXAMPLE 13

This application example relates to a moving object including the wireless communication device described in any of the above application examples.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
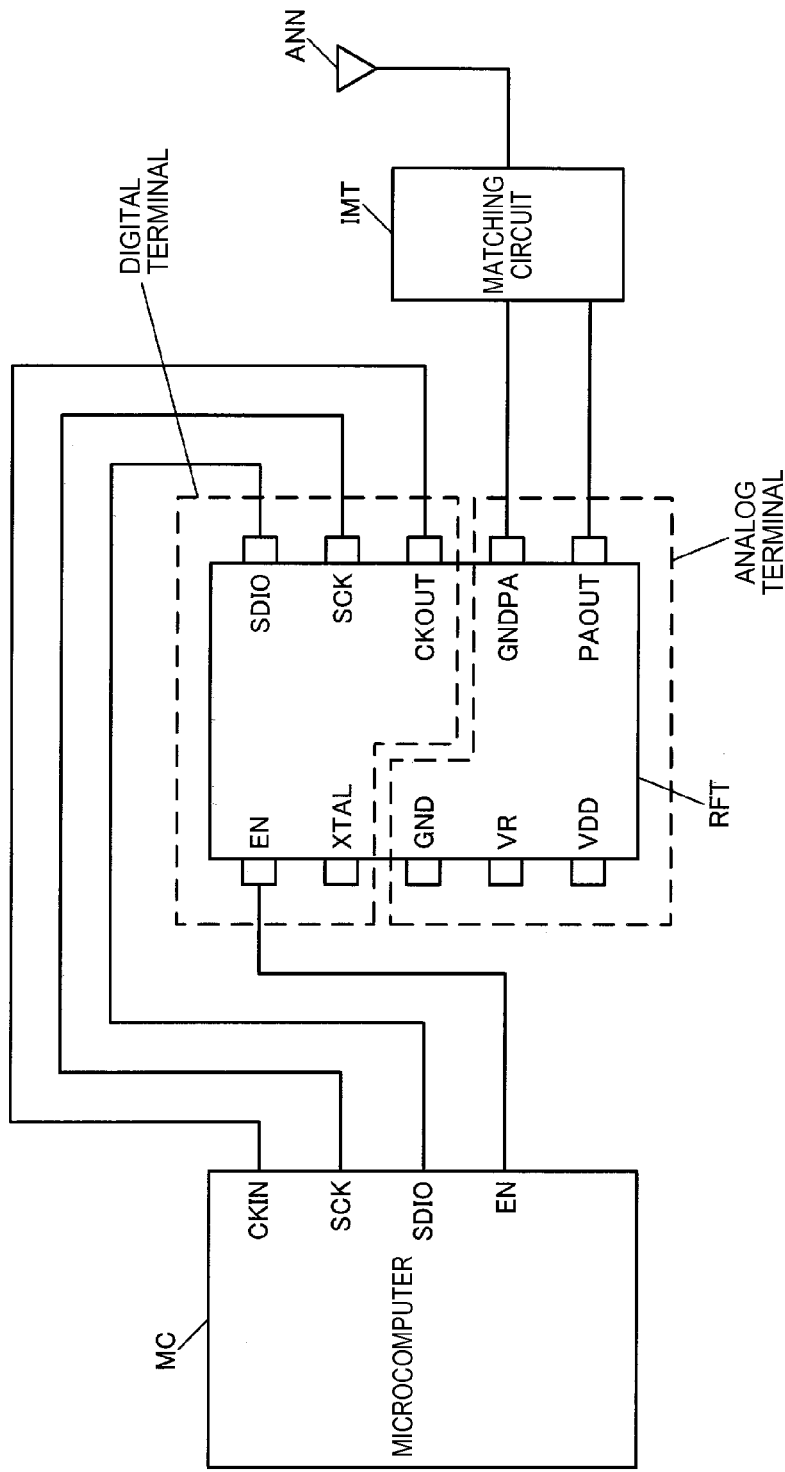
FIG. 1 is a diagram illustrating a second comparative example of a wireless communication device and a configuration example of a system including the wireless communication device.

Preferred embodiments according to the invention are described in detail below. Moreover, the embodiment described below does not improperly limit the subjects of the invention described in scopes of aspects, and does not limit all configurations described according to the present embodiment, as being necessarily indispensable for a solution according to the invention.

1. Comparative Example

First, a first comparative example of the present embodiment is described. The first comparative example is an example of what results from packaging a vibration piece and a wireless communication IC into one package, but an excitation electrode of the vibration piece is mounted on an amplifier of the wireless communication IC in such a manner that when an IC chip is viewed from above, the excitation electrode is superimposed on the amplifier. In this case, there is a likelihood that crosstalk between the amplifier of the wireless communication IC and an oscillation circuit of the vibration piece will increase, and this is a factor that prevents one packaging.

First, as an influence that the amplifier has on the vibration piece or the oscillation circuit, for example, the following influences are present. That is, as described below referring to FIG. 15, an amplifier (a power amplifier 220) drives an antenna by switching in the drive transistor TB2. Because a large amount of electric current of several tens of mA is caused to flow in order to send out an electromagnetic wave, a switching noise occurs from the drive transistor TB2. The switching noise propagates to within an IC or a circuit that is connected to the IC through an IC substrate or a power source line. Alternatively, there is a likelihood that the switching noise will be emitted, as a radiation noise, into the air.

For this reason, when the amplifier and the vibration piece are arranged close to each other within the package, it is easy for the switching noise to have an influence on the vibration piece. For example, as described below referring to FIGS. 16A and 16B, the excitation electrode covers the vibration piece, but when the excitation electrode is right over the amplifier (the excitation electrode is positioned to be superimposed on the amplifier when viewed from above), there is a high likelihood that the excitation electrode will absorb radiation of the switching noise. Alternatively, because the oscillation circuit is arranged to be close to the vibration piece, as there is a higher likelihood that the amplifier and the oscillation circuit will be close to each other within an IC, there is a higher likelihood that the switching noise will propagate to the oscillation circuit through the substrate or the power source line.

When the switching noise is added in this manner to the vibration piece or the oscillation circuit, a voltage with a frequency different from an oscillation frequency is applied to the vibration piece, and this provides a cause of an error or a variation in the oscillation frequency.

Furthermore, as an influence that the vibration piece or the oscillation circuit has on the amplifier, for example, the following influences are present. That is, specifications for wireless communication are stipulated in laws, and a signal level in a communication bandwidth or a signal level in bandwidths other than the signal level are stipulated, but the crosstalk is problematic when the specifications are satisfied. There are various unnecessary noises (spurious noises) other than a noise in a communication bandwidth, but for example, there is a noise due to reference leak in the wireless communication that uses a PLL circuit. In the wireless communication, because a reference clock is produced by an oscillator is multiplied by a PLL, a frequency of a carrier wave is different from a frequency of a reference clock. A phenomenon in which the reference clock is leaked into a transmission signal and a spurious noise occurs is the reference leak.

As one of occurrence sources of the reference leak, the vibration piece and the oscillation circuit are considered. When the vibration piece vibrates due to a piezoelectric effect, polarization in accordance with distortion (pressure) of the vibration piece happens and movements of electric charges occur between the vibration piece and the oscillation circuit. That is, the vibration piece or the oscillation circuit is an occurrence of an exceedingly large digital noise.

For this reason, when the amplifier and the vibration piece are arranged close to each other within the package, it is easy for the reference leak to occur. That is, there is a high likelihood that the amplifier and the oscillation circuit will be close to each other within an IC, a noise of the reference clock propagates from the vibration piece or the oscillation circuit to the amplifier through the substrate and the power source line, and it is easy for the reference leak to occur.

Next, a second comparative example of the present embodiment is described. The second comparative example is an example in which a discrete vibrator is externally attached. FIG. 1 illustrates the second comparative example of wireless communication device, and a configuration example of a system including the wireless communication device. The system in FIG. 1 includes a microcomputer MC, a wireless communication device RFT, a matching circuit IMT, and an antenna ANN.

The wireless communication device RFT is a device that generates a wireless transmission signal based on control from the microcomputer MC, and performs wireless transmission through the matching circuit IMT and the antenna ANN. Specifically, an externally mounted crystal vibrator is connected between a terminal XTAL and a ground terminal GND, and a crystal vibrator oscillates by the oscillation circuit that is built into the wireless communication device RFT. The wireless communication device RFT supplies a clock signal, generated from its transmission signal, from a terminal CKOUT to a microcomputer MC.

The microcomputer MC operates based on the clock signal, and inputs and outputs a control signal or wireless transmission data through an enabling terminal EN of the wireless communication device RFT, a data input and output terminal SDIO, and the data input and output clock terminal SCK.

The wireless communication device RFT generates a carrier wave signal by multiplying an oscillation signal using the PLL circuit, generates a transmission signal by modulating the carrier wave signal based on the wireless communication data, and outputs the transmission signal from output terminals GNDPA and PAOUT. The matching circuit IMT is a circuit that performs impedance matching between the wireless communication device RFT and the antenna ANN. The transmission signal is transmitted from the antenna ANN through the matching circuit IMT.

Moreover, a terminal VDD is a terminal to which a power source voltage is supplied from a power source (for example, a secondary battery or the like), and a terminal VR is a terminal that outputs a voltage generated by a regulator from the power source voltage.

Among the terminals described above, the terminals XTAL, EN, SDIO, SCK, and CKOUT are digital terminals through which a digital signal is input and output, and the terminals GNDPA, PAOUT, GND, VR, and VDD are analog terminals through which an analog signal is input and output. A package of the wireless communication device RFT is in the form of a rectangle, and the digital terminals are arranged on two long sides of the package, respectively. Furthermore, the analog terminals are also arranged on the two long sides of the package, respectively, and are arranged on each of the long sides, together with the digital terminals.

Due to this terminal arrangement, as illustrated in FIG. 1, wiring from the microcomputer MC to the wireless communication device RFT not only needs to be guided complicatedly on a mounting substrate, but wiring for a digital signal and wiring for an analog signal (for example, wiring for connections to the terminals CKOUT and GNDPA) are close to each other. Furthermore, the digital terminal and the analog terminal are arranged on the same long side, and bonding wires are also adjacent to each other within the package. A problem that arises here is that there is a high likelihood that crosstalk (coupling) between the analog signal and the digital signal will occur in the comparative example in FIG. 1.

From a point of view of the reference leak described above, in the comparative example in FIG. 1, the reference clock (or a clock that results from division of the reference clock) is output from the terminal CKOUT, and the terminal CKOUT is adjacent to the analog output terminal GNDPA. For this reason, there is a high likelihood that the reference clock and the transmission signal will be coupled and the reference leak will occur.

Furthermore, a problem to note from a point of view of externally attaching the vibrator or of the complex guidance of the wiring is that a system is prevented from being miniaturized. When the package or the mounting substrate is assumed to be miniaturized, a situation occurs in which a distance between the bonding wires within the package and a pitch of the terminal, and a distance between wiring lines on the mounting substrate are made to be small and it is easy for the crosstalk to occur increasingly.

Furthermore, as described above, because the vibrator is externally attached, it is difficult to improve the precision of the oscillation frequency. With a commercial crystal vibrator, a frequency error of approximately ±50 ppm is generally guaranteed. The frequency error is guaranteed in a case where an oscillation capacitor with a capacity value (for example, 12 pF) stipulated in specifications is used. A user combines the crystal vibrator and the wireless communication IC referring to the specifications for their use. In a case where such general-purpose products are combined, because the crystal vibrator that is a finished product is used, when the crystal vibrator is combined with the wireless communication IC, it is difficult to tune to the oscillation frequency at a later time.

Because an error in the oscillation frequency is the frequency error in the carrier wave, a receiving bandwidth tolerating only the frequency error is obtained on the receiving side as well. That is, the receiving bandwidth also has to be broad in a state where the frequency error in the crystal vibrator is great. It is known that when the receiving bandwidth is broadened, receiving sensitivity falls, and in order to maintain the wireless communication with the same sensitivity at the same distance, there is a need to increase transmission power as much as the receiving bandwidth is broadened. Because when transmission power is increased, power consumption is also increased, this is disadvantageous in terms of saving of a dry cell power or a batter power, which is important particularly in a small-sized device.

2. Wireless Communication Device

Figure 2:
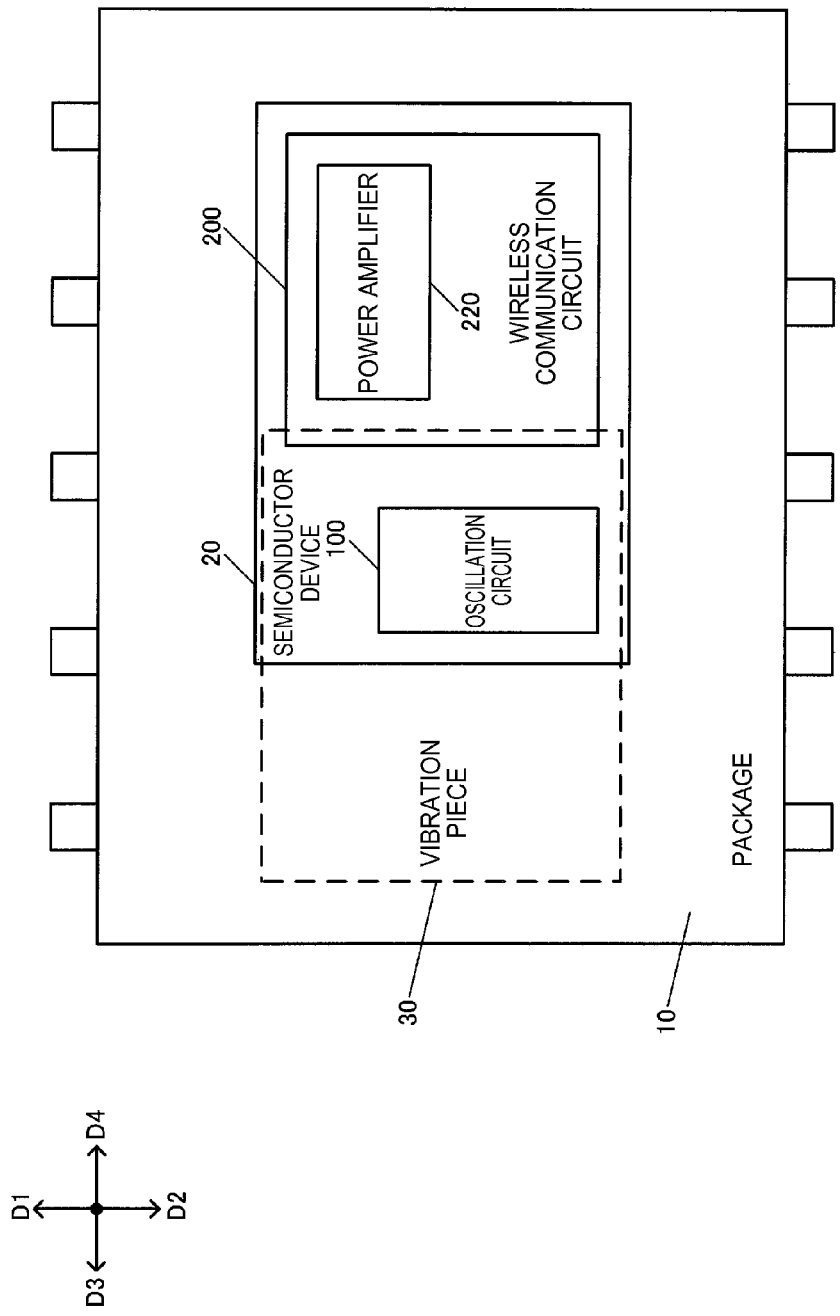
FIG. 2 is a diagram illustrating a first configuration example of a wireless communication device according to the present embodiment.

FIG. 2 illustrates a first configuration example of the wireless communication device according to the present embodiment, which can solve the problems described above.

The wireless communication device includes a vibration piece 30 and a semiconductor device 20 that is connected to the vibration piece 30. The semiconductor device 20 includes an oscillation circuit 100 of the vibration piece 30 and a wireless communication circuit 200. The wireless communication circuit 200 has the power amplifier 220 (the amplifier in a broad sense) that amplifies a wireless signal generated based on the oscillation circuit 100. Then, the vibration piece 30 and the semiconductor device 20 are encapsulated into one package. An excitation electrode (an excitation electrode of a first electrode 32 in FIGS. 16A and 16B) of the vibration piece 30 is arranged in a package 10, in such a manner that the excitation electrode is not superimposed on the power amplifier 220 when the semiconductor device 20 is viewed from above.

The vibration piece 30 is a solid vibration piece (a piezoelectric vibration piece) that causes vibration with a nature frequency to occur by applying a voltage. For example, the vibration piece 30 is a crystal vibration piece (for example, an AT cut-type vibration piece). Alternatively, the vibration piece 30 may be a ceramic vibration piece or the like.

As a case where the excitation electrode of the vibration piece 30 is arranged in such a manner that the excitation electrode is not superimposed on the power amplifier 220 when viewed from above in the thickness direction of the substrate of the semiconductor device 20, the following cases are present. A first case is a case where one portion or all portions of the excitation electrode are superimposed on the semiconductor device 20 and the excitation electrode is not superimposed on the power amplifier 220. In this case, as illustrated in FIG. 2, the vibration piece 30 is arranged in such a manner that the vibration piece 30 is superimposed on one portion of the semiconductor device 20 when viewed from above in the thickness direction of the semiconductor device 20. A portion of the vibration piece 30, which is not covered with the excitation electrode, may be superimposed on the power amplifier 220, but it is desirable that the portion is not superimposed on the power amplifier 220. A second case is a case where none of the portions of the entire excitation electrode is superimposed on the semiconductor device 20. In this case, the vibration piece 30 is arranged in such a manner that the vibration piece 30 is not superimposed on the semiconductor device 20 when viewed from above. Alternatively, a portion of the vibration piece 30, which is not covered with the excitation electrode, may be arranged in such a manner that the portion is superimposed on the semiconductor device 20.

The package 10 encapsulates the vibration piece 30 and the semiconductor device 20, and connects the semiconductor device 20 and an external circuit or wiring (for example, printed substrate wiring) through a terminal that is provided to the package 10. For example, the package 10 is configured from a frame in the form of a sheet made of ceramics or a mold frame made of plastics, a metal post formed on a surface of the frame or within the package, an electrode pad, wiring, terminals, and the like.

The semiconductor device 20 results from forming an analog circuit and a digital circuit on a semiconductor substrate (for example, a silicon substrate or the like) using semiconductor processes. The semiconductor processes are processes that include processes of implanting impurities, forming an insulating layer, forming a polysilicon layer, forming an aluminum layer, forming a passivation layer, and so forth.

The wireless communication circuit 200 is a circuit that controls wireless communication and sends out a wireless transmission signal (operates an antenna). For example, the wireless communication circuit 200 can include a fractional N-type PLL circuit 210 described below. Then, the wireless communication circuit 200 receives communication data from an external controller (a microcomputer and the like). The fractional N-type PLL circuit 210 generates a carrier wave signal by performing fractional multiplication (including integer multiplication) of an oscillation signal, as a reference clock signal, from the oscillation circuit 100, modulates the carrier wave signal bases on the communication data, and generates a wireless transmission signal. Then, the power amplifier 220 amplifies the wireless transmission signal, outputs the amplified wireless transmission signal to an antenna, and performs the wireless transmission.

As described above, by arranging the excitation electrode of the vibration piece 30 in such a manner that the excitation electrode is not superimposed on the power amplifier 220 when the semiconductor device 20 is viewed from above, it is possible to reduce the crosstalk between the vibration piece 30 or the oscillation circuit 100 and the power amplifier 220. Accordingly, the error in the oscillation frequency of the vibration piece 30 that is a factor that prevents one packaging or the reference leak can be reduced, and it is possible to realize one packaging.

That is, because the excitation electrode of the vibration piece 30 is not right over the power amplifier 220, it is difficult for the excitation electrode to absorb a switching noise radiated from the power amplifier 220. Accordingly, an influence of the power amplifier 220 on the vibration piece 30 can be decreased.

Furthermore, that the excitation electrode of the vibration piece 30 is not superimposed on the power amplifier 220 means that the vibration piece 30 is shifted to a location that is positioned a distance away from the power amplifier 220 when viewed from above. Accordingly, mutual crosstalk between the vibration piece 30 and the power amplifier 220 is suppressed.

As described in the first comparative example, generally, the oscillation circuit 100 is arranged close to the vibration piece 30. According to the present embodiment, because the vibration piece 30 is shifted to a location that is positioned a distance away from the power amplifier 220, the oscillation circuit 100 and the power amplifier 220 are kept away from each other as well. Accordingly, the mutual crosstalk between the oscillation circuit 100 and the power amplifier 220 is suppressed.

Furthermore, pads (PXG, and PXD in FIG. 4) that are connected to the oscillation circuit 100 are arranged close to the oscillation circuit 100, and there is a high likelihood that pads (PRFC, PPAQ, and PVSPA in FIG. 4) that are connected to the power amplifier 220 will be arranged close to the power amplifier 220. For this reason, a distance between these pads, or a distance between bonding wires that are connected to the pads is also increased, and the crosstalk between the bonding wires is also suppressed.

Moreover, the wireless communication circuit 200 according to an embodiment, which is described below, includes the fractional N-type PLL circuit 210. In this case, it is possible to tune to the oscillation frequency and so forth as described below.

That is, the fractional N-type PLL circuit 210 can perform the fractional multiplication. That is, even if a frequency of the reference clock is single, not only a carrier wave signal that results from performing the fractional multiplication of the reference clock can be generated, but also a carrier wave can be generated with arbitrary frequency in integer multiples. Accordingly, even if a combination with a specific vibration piece 30 is performed, the carrier wave signal with an arbitrary frequency can be realized and it is possible to satisfy the laws in accordance with an intended purpose or a usage country. In this manner, by employing the fractional N-type PLL circuit 210, it is possible to integrate the vibration piece 30 and the semiconductor device 20 (the wireless communication IC) into one package, and a system that uses the wireless communication device can be miniaturized.

Furthermore, by integrating the vibration piece 30 and the semiconductor device 20 into one package, it is possible to reduce (decrease) the error in the oscillation frequency. That is, the vibration piece 30 and the semiconductor device 20 are mounted into the package 10, and thereafter, for example, the oscillation signal (or the clock signal that results from the division of the oscillation signal) of the vibration piece 30 is probed before a lid of the package 10 is closed. For example, the oscillation frequency can be adjusted by emitting an ion beam to the vibration piece 30 in such a manner that the frequency falls within a desired error range. In a case where a discrete crystal oscillation piece is externally attached in the first comparative example, it is impossible to perform turning using the ion beam after the vibration piece is integrated with the wireless communication IC. Eventually, it is possible to tune to the oscillation frequency during manufacturing in combining a specific vibration piece 30 and the semiconductor device 20 by performing the one package integration according to the present embodiment.

As described above, the error in the oscillation frequency is an error in the carrier wave frequency. In the wireless communication, it is known that the narrower the receiving bandwidth, the higher the receiving sensitivity. By decreasing the frequency error on the transmitting side, the receiving bandwidth can be made to be narrow and the receiving sensitivity can be made to be high. This means that communication can be performed with low transmission power. For example, in the keyless entry module and the like, with the saving of the transmission power, it is possible to save limited electric power (battery power).

Furthermore, as described below in FIGS. 6 to 8, wiring for a digital signal is a cause of unnecessary radiation, and the longer the wiring line, the more easily the unnecessary radiation occurs. According to the present embodiment, because by integrating the vibration piece 30 into the one package, there is no need to provide the wiring for the oscillation signal to the mounting substrate, it is possible to make the unnecessary radiation from the wiring unnecessary.

Figure 3:
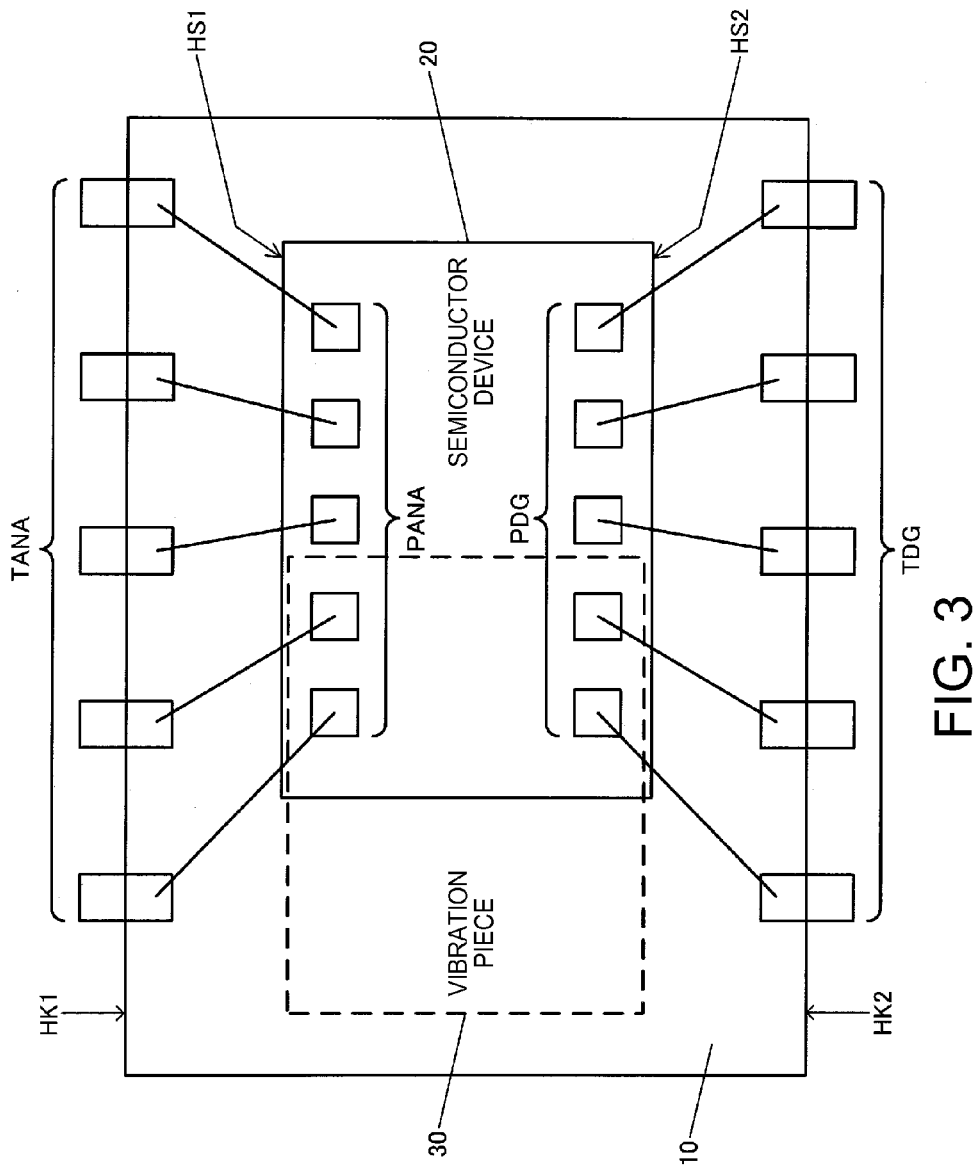
FIG. 3 is a diagram illustrating a second configuration example of the wireless communication device according to the embodiment.
Figure 3:
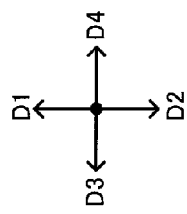

FIG. 3 illustrates a second configuration example of the wireless communication device according to the present embodiment, which can solve the problems described in the comparative example.

The wireless communication device (a circuit built into the vibration piece) includes the vibration piece 30, the semiconductor device 20 that is connected to the vibration piece 30, and the package 10 that accommodates the vibration piece 30 and the semiconductor device 20.

Then, in the semiconductor device 20, an analog pad PANA is provided along a first outer edge HS1 in a first direction D1 when the semiconductor device 20 is viewed from above. Furthermore, a digital pad PDG is provided along a second outer edge HS2 that faces the first outer edge HS1 that is an outer edge in the second direction D2 opposite to the first direction D1.

In the package 10, an analog terminal TANA that is connected to the analog pad PANA is provided on a side HK1 of the first package in the first direction D1. Furthermore, a digital terminal TDG that is connected to the digital pad PDG is provided on a side HK2 of a second package in the second direction D2.

The vibration piece 30 is arranged in a third direction D3 or a fourth direction D4 of the semiconductor device 20 in the package 10. The third direction D3 and the fourth direction D4 are directions that intersect (for example, is orthogonal to) the first direction D1 and the second direction D2.

The digital pad PDG and the digital terminal TDG are a pad and a terminal for inputting or outputting digital signal, respectively. The digital signal is a signal that is expressed as two values, that is, a first voltage level (for example, a power source voltage level) on a high potential side and a second voltage level (for example a ground voltage level) on a low potential side. A digital circuit is a circuit that processes the digital signal.

The analog pad PANA and the analog terminal TANA are a pad and a terminal for inputting or outputting an analog signal, respectively. The analog signal is a voltage signal that can have an arbitrary voltage level between the first voltage level and the second voltage level, or is an electric current signal that can have an arbitrary electric current value. Furthermore, the analog signal includes a voltage of a power source or a ground voltage. An analog circuit is a circuit that processes the analog signal.

Moreover, definitions of "analog" and "digital" are not limited to the descriptions provided above. For example, in the semiconductor device 20 that is described below referring to FIG. 10, a power source for an analog circuit and a power source for a digital circuit are prepared. In this case, a digital circuit and an analog circuit may be distinguished depending on whether a power source is for an analog circuit or for a digital circuit, that is, on which power line a power source voltage is supplied from. Alternatively, in the semiconductor device 20 in FIG. 10, one portion of the fractional N-type PLL circuit 210 receives electric power from the power source for the digital circuit. Such a portion is a circuit that performs a digital operation with a frequency of the reference clock, and an effect is accomplished which suppresses the reference leak by separating the power source lines. In this manner, a circuit that is an occurrence source of a digital noise (a reference leak in FIG. 10) may be defined as a digital circuit, and a circuit element that leads to signal degradation when such a noise is coupled may be defined as an analog circuit.

As described above, the analog pad PANA is provided along the first outer edge HS1 of the semiconductor device 20, but the first outer edge HS1 here, for example, is an outer edge in the first direction D1 when viewed from the middle portion of the semiconductor device 20. Furthermore, the second outer edge HS2 on which the digital pad PDG is provided, for example, is an outer edge in the second direction D2 when viewed from the middle portion of the semiconductor device 20. For example, in a case where the semiconductor device 20 has the shape of a rectangle, two sides of the rectangle, which are in parallel, are the first outer edge HS1 and the second outer edge HS2. The first direction D1 and the second direction D2 are directions on a plane that is in parallel with the substrate of the semiconductor device 20 and are directions that are opposite (makes an angle of 180 degrees with respect to each other) to each other while running in parallel with each other.

When it comes to a side of the package 10, in the same manner, for example, aside in the first direction D1 when viewed from the middle portion (or a position in which the semiconductor device 20 is provided) of the package 10 is the side HK1 of the first package. That is, the side HK1 of the first package faces the first side HS1 of the semiconductor device 20. Furthermore, a side in the second direction D2 when viewed from the middle portion of the package 10 is a side of the second package, and the side HK2 of the second package faces the second outer edge HS2 of the semiconductor device 20. For example, the package 10 has the shape of a rectangle, and two sides of the rectangle are the side HK1 of the first package and the side HK2 of the second package.

The pad and the terminal described above is provided along an outer edge, but an expression here, "along an outer edge," may mean that the pad or the terminal are separated a distance away from the outer edge (for example, are arranged inward from the edge), without being limited to a case where the pad or the terminal comes into contact with the outer edge. Furthermore, distances from the outer edges of the pads or the terminals may be different from each other without the need for the pads or the terminals to be arranged side by side in a straight line along the outer edge. For example, the pads or the terminals may be arranged side by side in an alternate (zigzag or meandering) manner.

According to the embodiment described above, by building the vibration piece 30 into the package 10, a small-sized wireless communication device can be realized and the crosstalk between the digital signal and the analog signal can be suppressed.

Specifically, the crosstalk within the semiconductor device 20 can be suppressed by separating the analog pad PANA and the digital pad PDG in such a manner that they are arranged on the two outer edges HS1 and HS2, respectively, which face the semiconductor device 20. That is, because wiring for analog that connects the analog circuit and the analog pad PANA to each other and wiring for digital that connects the digital circuit and the digital pad PDG to each other extends in opposite directions, it is easy to avoid parallel running of or intersection of the wiring for analog and the wiring for digital and thus perform a layout design, and the crosstalk between wiring lines or between the circuits can be suppressed.

Furthermore, by separating the analog terminal TANA and the digital terminal TDG in such a manner that they are arranged on the two sides HK1 and HK2, respectively, that face the package 10, the crosstalk inside of the package 10 and outside of the package 10 can be suppressed. That is, because an analog wire that connects the analog pad PANA and the analog terminal TANA to each other and a digital wire that connects the digital pad PDG and the digital terminal TDG to each other are arranged in opposite directions, the crosstalk between the wires can be suppressed without the parallel running of the analog wire and the digital wire. Furthermore, in the system that includes the wireless communication device, because a digital portion and an analog portion are separated in such a manner that they are separately arranged on the side HK1 of the first package and the side HK2 of the second package, respectively, on the mounting substrate, the crosstalk on the mounting substrate can be suppressed.

For example, in the communication system that is described below in FIG. 8, an microcomputer 410 that is the digital portion and the matching circuit 430 and the antenna 440 that are the analog portions can be arranged on both sides of the wireless communication device 420, respectively. Accordingly, considerably simple wiring can be realized on the mounting substrate, and the crosstalk on the mounting substrate is suppressed without the wiring for the analog signal and the wiring for the digital signal being in close proximity to each other. As described in the comparative example, in the wireless communication, it is important to comply, particularly, with the specifications stipulated in the laws, and according to the embodiment, it is exceedingly advantageous to be able to suppress the crosstalk in all stages. Furthermore, in the wireless communication, the reference leak occurs in theory, but according to the present embodiment, because the terminal CKOUT (digital) for the reference clock and the terminal VSSPA and PAOUT (analog) for the transmission signal are not in close proximity to each other, the reference leak can effectively be suppressed.

3. Layout Configuration of the Semiconductor Device

Figure 4:
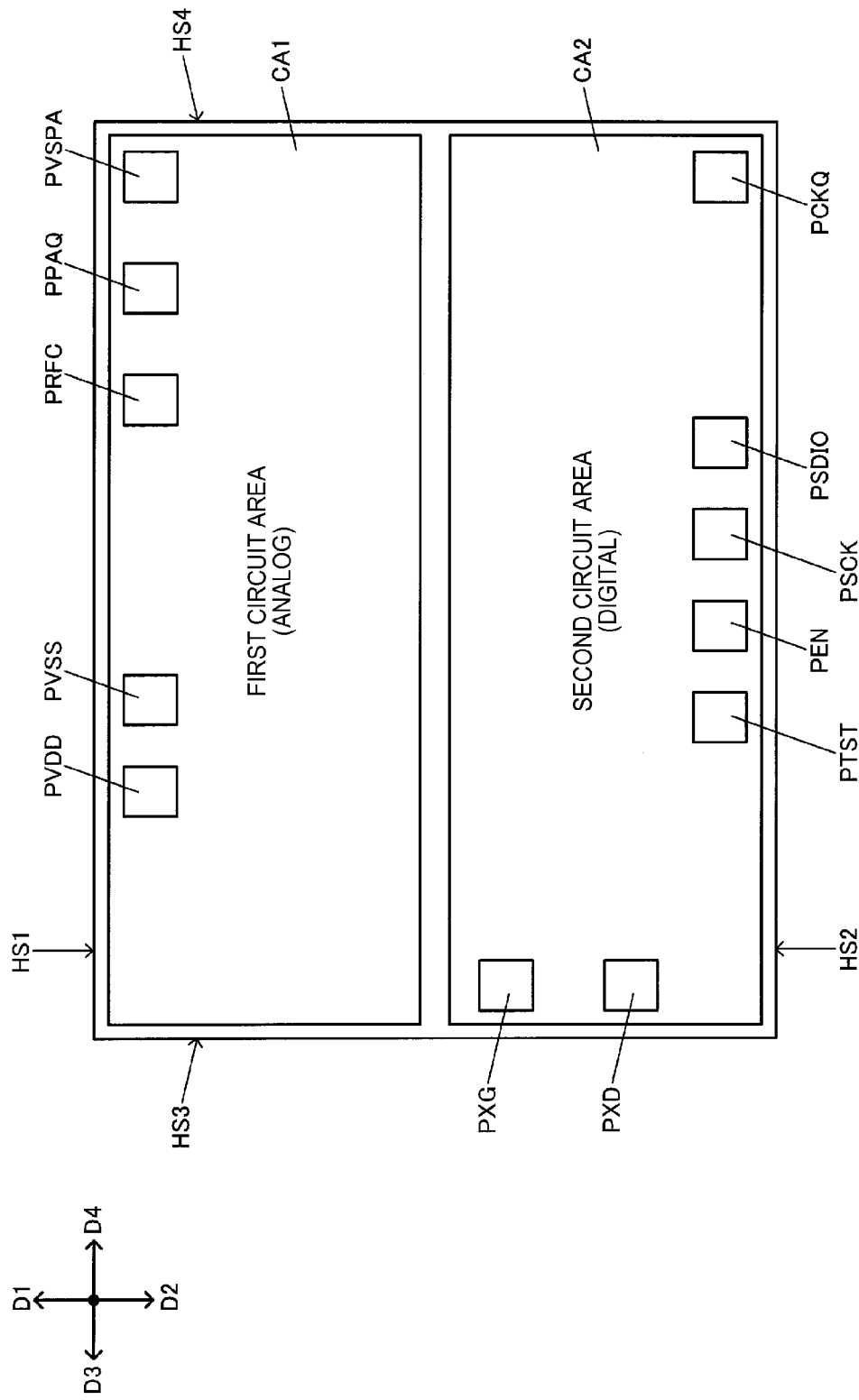
FIG. 4 is a diagram illustrating a first layout configuration example of a semiconductor device.

FIG. 4 illustrates a first layout configuration example of the semiconductor device. FIG. 4 illustrates a layout that results when the semiconductor device 20 is viewed from above starting from the flank side on which a circuit is formed.

In the semiconductor device 20, an analog circuit that is connected to the analog pad PANA is provided in a first circuit area CA1 in the first direction D1. Furthermore, a digital circuit that is connected to the digital pad PDG is provided in a second circuit area CA2 in the second direction D2.

As the analog pads PANA, the semiconductor device 20 in FIG. 3 includes pad PRFC and PPAQ that output a wireless signal, a pad PVSPA that supplies a wireless signal ground voltage, a pad PVDD into which a system power source voltage is input, and a pad PVDD in which a ground voltage of a system is input. As the digital pads PDG, the semiconductor device 20 includes a pad PTST that inputs and outputs a test signal, a pad PEN into which an enabling signal is input, a pad PSCK into which a control signal clock is input, a pad PSDIO that a control signal (a control command, contents of register setting, or the like) or wireless transmission data is input into and output from, a PCKQ that outputs a clock signal, and pads PXG and PXD for connecting the oscillation circuit and the vibration piece 30 to each other.

The first circuit area CA1 is an area that is positioned in the first direction D1, that is, on the first outer edge HS1 side. That is, the first circuit area CA1 is an area that comes into contact with (or is in close proximity to) at least the first outer edge HS1, and is an area that does not come into contact with (or is not in close proximity to) the second outer edge HS2. Analog pads PRFC, PPAQ, PVSPA, PVDD, and PVSS are arranged in the first circuit area CA1, and wiring between these pads and the analog circuit is performed, for example, within the first circuit area CA1.

The second circuit area CA2 is an area that is positioned in the second direction D2, that is, on the second outer edge HS2 side. That is, the second circuit area CA2 is an area that comes into contact with (or is in close proximity to) at least the second outer edge HS2, and is an area that does not come into contact with (or is not in close proximity to) the first outer edge HS1. Digital pads PTST, PEN, PSCK, PSDIO, PCKQ, PXG, and PXD are arranged in the second circuit area CA2, and wiring between these pads and the digital circuit is performed, for example, within the second circuit area CA2.

According to the embodiment described above, wiring from the analog circuit to the analog pad PANA within the first circuit area CA1, or wiring between the analog circuits can be connected. Furthermore, wiring from the digital circuit to the digital pad PDG within the second circuit area CA2, or wiring between the digital circuits can be connected. Accordingly, within the semiconductor device 20, the analog circuit and the digital circuit can be clearly separated from each other, and analog signal wiring and digital signal wiring can be clearly separated from each other. That is, because there is no need to guide the analog signal wiring closely to the digital circuit or the digital signal wiring, the coupling between the digital and the analog can be avoided. Furthermore, starting with making an arrangement area clearly defined, there is a low likelihood that the analog signal wiring and the digital signal wiring will unintendedly run in parallel, and a design burden of checking for the parallel running is reduced.

Furthermore, by arranging the analog circuit in the first direction D1 and arranging the digital circuit in the second direction D2, consequently, the analog pad PANA is arranged in the first outer edge HS1 and the digital pad PDG is arranged in the second outer edge HS2. Accordingly, by further arranging the analog terminal TANA and the digital terminal TDG on individual outer edges, respectively, in the package 10 as well, the crosstalk, as described above, can be suppressed in all stages in other than the semiconductor device 20, the bonding wire, and the package 10.

Next, arrangement of vibration piece pads PXG and PXD that are connected to the vibration piece 30 is described. As illustrated in FIG. 4, the vibration piece pads PXG and PXD are provided along a third outer edge HS3 that extends (lengthens) along the direction (the first direction D1) that intersects the first outer edge HS1 and the second outer edge HS2.

The third outer edge HS3, for example, is an outer edge in the third direction D3 when viewed from the middle portion of the semiconductor device 20. The third direction D3 is a direction on a plane that is in parallel with a plane of the substrate of the semiconductor device 20, and is a direction that intersects (for example, is orthogonal to) the first direction D1 and the second direction D2. In a case where the semiconductor device 20 has the form of a rectangle or a square when viewed from above, the third outer edge HS3 is an outer edge that intersects the first outer edge HS1 and the second outer edge HS2.

As described in the comparative example, the wireless communication device has a problem of unnecessary radiation due to the reference leak. Furthermore, there is a problem that an error occurs in the oscillation frequency of the vibration piece 30 or the oscillation circuit 100. According to the present embodiment, because the vibration piece 30 is built into the package 10 and the oscillation circuit is built into the semiconductor device 20, a condition in which the problems described above occur easily is provided.

In this respect, according to the present embodiment, the vibration piece pads PXG, PXD are provided along the third outer edge HS3, and the analog pad PANA is provided along the first outer edge HS1. Accordingly, the bonding wire that is connected to the analog pad PANA extends in the first direction D1, and the bonding wire that is connected to the vibration piece pads PXG and PXD extends in the third direction D3. Because the first direction D1 and the third direction D3 are directions that intersect each other, the crosstalk does not occur between the oscillation signal and the analog signal, without the bonding wires being in close proximity to or being mixed with each other. In this manner, a mutual bad influence (a reference leak or an error in the oscillating frequency) that occurs between the vibration piece 30 or the oscillation circuit and the power amplifier 220 can be suppressed.

Furthermore, by providing the vibration piece pads PXG and PXD on the third outer edge HS3 that intersects the first outer edge HS1, distances from the vibration piece pads PXG and PXD are separated along the first outer edge HS1. That is, it is possible to separate a signal that needs to avoid an influence of the digital noise much more from the vibration piece pads PXG and PXD. For example, the PLL circuit is used in the wireless communication device, and it is possible to reduce the reference leak to some extent with a low pass filter (a loop filter). However, in a case where the reference leak rides on a certain output unit (a power amplifier or the like) at the rear portion of the low pass filter, the reference leak cannot be removed thereafter. According to the present embodiment, the pads PRFC, PPAQ, PVSPA that output a transmission signal is arranged in a location that is positioned a distance away from the third outer edge HS3, and the reference leak from the vibration piece 30 can effectively be suppressed as well.

Figure 5:
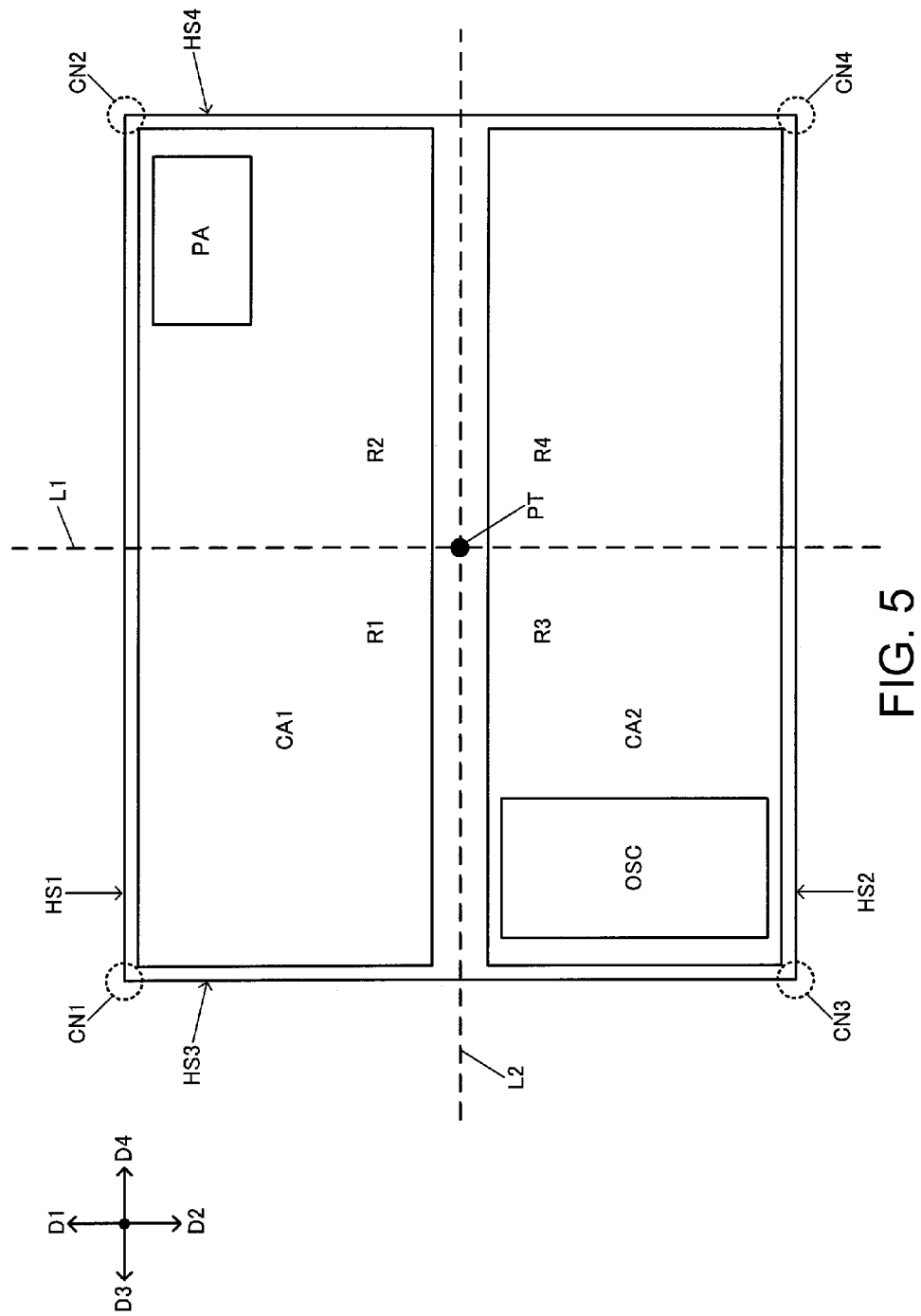
FIG. 5 is a diagram illustrating a second layout configuration example of the semiconductor device.

FIG. 5 illustrates a second layout configuration example of the semiconductor device. FIG. 5 illustrates a layout that results when the semiconductor device 20 is viewed from above starting from the flank side on which a circuit is formed.

As illustrated in FIG. 5, in the first circuit area CA1, an analog signal buffer circuit is arranged in an area PA that is closer to a fourth outer edge HS4 than the third outer edge HS3 of the semiconductor device 20. Furthermore, in the second circuit area CA2, the oscillation circuit of the vibration piece 30 is arranged in an area OSC that is closer to the third outer edge HS3 than the fourth outer edge HS4.

The fourth outer edge HS4 is an edge that faces the third outer edge HS3 which is an outer edge that extends along a direction that intersects the first outer edge HS1 and the second outer edge HS2, and for example, is an outer edge in the fourth direction D4 when viewed from the middle portion of the semiconductor device 20. The fourth direction D4 is a direction on a plane that is in parallel with a plane of the substrate of the semiconductor device 20, is a direction in intersects (for example, is orthogonal to) the first direction D1 and the second direction D2, and is a direction that is in parallel with the third direction D3 and that faces (makes an angle of 180 degrees with respect to the third direction D3) the direction opposite to the third direction D3. In a case where the semiconductor device 20 has the form of a rectangle or a square when viewed from above, the fourth outer edge HS4 is an outer edge that intersects the first outer edge HS1 and the second outer edge HS2, and that is in parallel with the third outer edge HS3.

The analog signal buffer circuit is a circuit that amplifies (buffers) an analog signal generated in the analog circuit of the semiconductor device 20 and outputs the amplified analog signal from the analog pad PANA. The analog signal buffer circuit is equivalent to the power amplifier 220 in the wireless communication device that is described below referring to FIG. 10. The power amplifier 220 is a circuit that outputs a transmission signal generated in the fractional N-type PLL circuit 210 to an antenna through the pads PRFC, PPAQ, and PVSPA.

A distance from the area PA in which such a buffer circuit is arranged to the fourth outer edge HS4 is shorter than a distance from the area PA to the third outer edge HS3. Furthermore, a distance from the area OSC in which the oscillation circuit is arranged to the third outer edge HS3 is shorter than a distance from the area OSC to the fourth outer edge HS4. It is possible to define the distance in various ways, but for example, a length of a perpendicular line downward from the center of an area to each outer edge can be defined as a distance. Alternatively, a length of a perpendicular line downward from the closest point to each outer edge in an area to the each outer edge may be defined as a distance.

Moreover, a positional relationship between each of the area PA, and the area OSC and each of the first outer edge HS1 and the second outer edge HS2 is not particularly limited. However, if it is considered that the area PA is positioned in the first circuit area CA1 and that the area OSC is positioned in the second circuit area CA2, it is desirable that the area PA is an area that is closer to the first outer edge HS1 than the second outer edge HS2 and that the area OSC is an area that is closer to the second outer edge HS2 than the first outer edge HS1.

Specifically, the semiconductor device 20 is partitioned by a first line L1 and a second line L2 that pass through the center PT of the semiconductor device 20 and intersect each other when the semiconductor device 20 is viewed from above. Areas that result from the partitioning are a first area R1 that includes a corner CN1 at which the first outer edge HS1 and the third outer edge HS3 intersect each other, a second area R2 that includes a corner CN2 at which the first outer edge HS1 and the fourth outer edge HS4 intersect each other, a third area R3 that includes a corner CN3 at which the second outer edge HS2 and the third outer edge HS3 intersect each other, and a fourth area R4 that includes a corner CN4 at which the second outer edge HS2 and the fourth outer edge HS4 intersect each other. In this case, the oscillation circuit (the area OSC) is arranged in the third area R3, and the power amplifier (the area PA, the analog signal buffer circuit) is arranged in the second area R2.

It is possible to define the center PT of the semiconductor device 20 in various ways, and for example, the center PT is a point at which a line connecting the center point of the first outer edge HS1 and the center point of the second outer edge HS2 and a line connecting the center point of the third outer edge HS3 and the center point of the fourth outer edge HS4 intersect each other. Alternatively, the center PT may be a point at which diagonal lines of a rectangle that is made up of the first to fourth outer edges HS1 to HS4.

The first line L1 is, for example, a line in parallel with the first outer edge HS1 and the second outer edge HS2, and the second line L2 is, for example, a line in parallel with the third outer edge HS3 and the fourth outer edge HS4. In a case where the semiconductor device 20 has the form of a rectangle, for example, the first line L1 and the second line L2 are lines that intersect each other. In this case, the first to fourth areas R1 to R4 are 4 areas that are equal in size. Moreover, the corners CN1 to CN4 are points at which two edges intersect each other, and are corners (angles) of a rectangle.

As illustrated in FIG. 4, when a digital noise such as the reference leak is added to an output buffer that is at a final stage of analog, the digital noise is exceedingly difficult to remove at the latter part of the stage.

In this respect, in a layout in FIG. 5, the area OSC of the oscillation circuit is arranged close to the third outer edge HS3 and the area PA of the power amplifier is arranged close to the fourth outer edge HS4, and thus the oscillation circuit that is an occurrence source of the digital noise and the power amplifier that performs analog output are respectively arranged at locations which are positioned a distance from each other. For example, in a case where the first outer edge HS1 and the second outer edge HS2 are long sides, a distance between the third outer edge HS3 and the fourth outer edge HS4 that are short sides is greater than a distance between the long sides. That is, it is possible to arrange the occurring source of the noise in a location that is positioned as far as possible from the power amplifier.

Moreover, among the first to fourth areas R1 to R4 that result from (conveniently) partitioning the semiconductor device 20, the power amplifier and the oscillation circuit are arranged in the second area R2 and the third area R3, respectively, and thus the occurrence source of the noise and the power amplifier can be positioned away in the diagonal direction from each other. When this is done, the power amplifier and the oscillation circuit are arranged the greatest distance away from each other in the semiconductor device 20, and the effect of suppressing a bad influence (the reference leak and the error in the oscillation frequency) that is mutually exerted between the oscillation circuit and the power amplifier can be expected to be increased.

Furthermore, the oscillation circuit and the power amplifier are positioned a distance away from each other, and thus the pads PXG and PXD that are connected to the oscillation circuit and the pads PRFC, PPAQ, and PVSPA that are connected to the power amplifier are arranged in the locations that are positioned a distance away from each other. Accordingly, the bonding wires that are connected to these pads extend in opposite directions, and thus the likelihood that the crosstalk between the oscillation circuit and the power amplifier will also occur between the bonding wires can be exceedingly decreased.

Moreover, in FIG. 5, an area (the first circuit area CA1) of the analog circuit and an area (the second circuit area CA2) of the digital circuit are arranged with the second line L2 as a border, but the arrangement is not limited to this. For example, as described below in FIG. 11, the area of the analog circuit and the area of the digital circuit may be separated by one partition line that is not a straight line, and the partition line does not need to pass through the center of the semiconductor device 20.

4. Detailed Configuration of the Package

Figure 6:
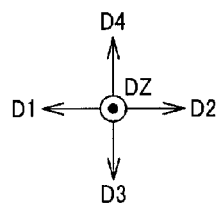
FIG. 6 is a diagram illustrating a detailed configuration example of a package in which a vibration piece and the semiconductor device are mounted.
Figure 6:
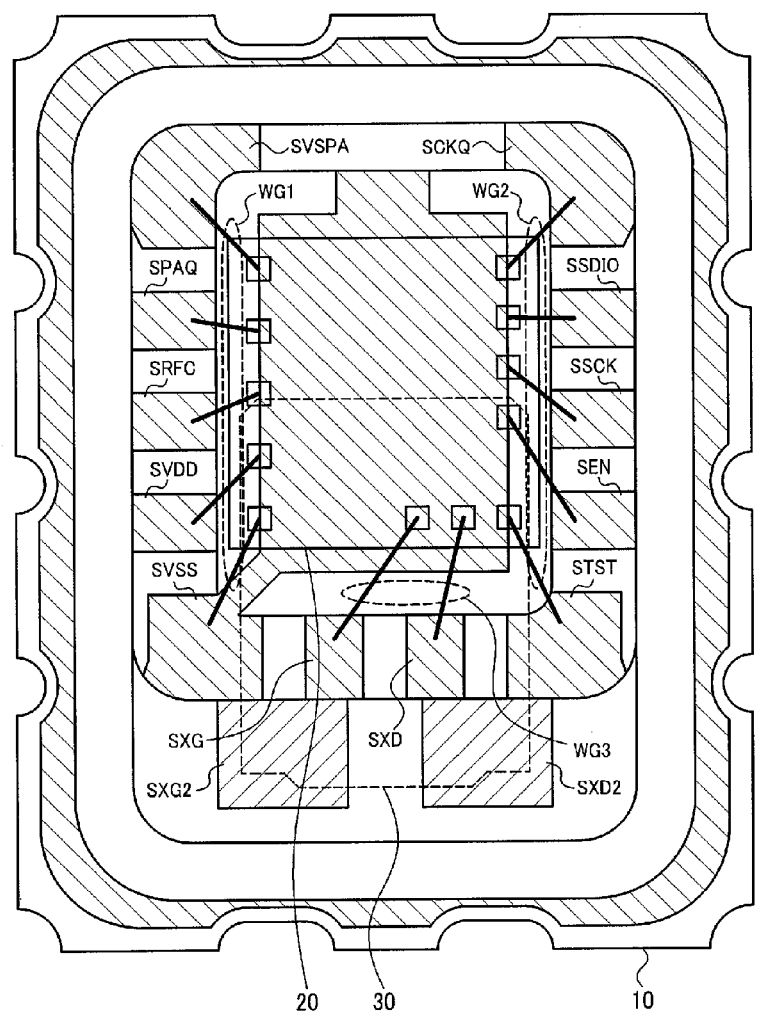
Figure 7:
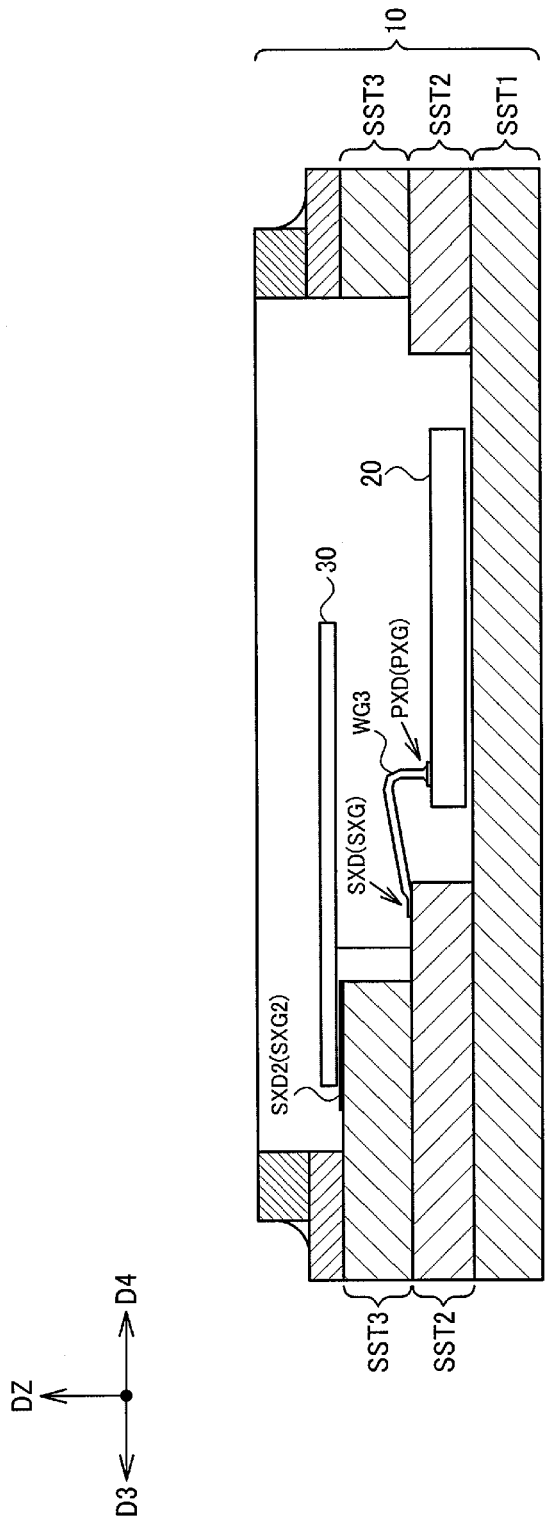
FIG. 7 is a diagram illustrating a detailed configuration example of the package in which the vibration piece and the semiconductor device are mounted.
Figure 8:
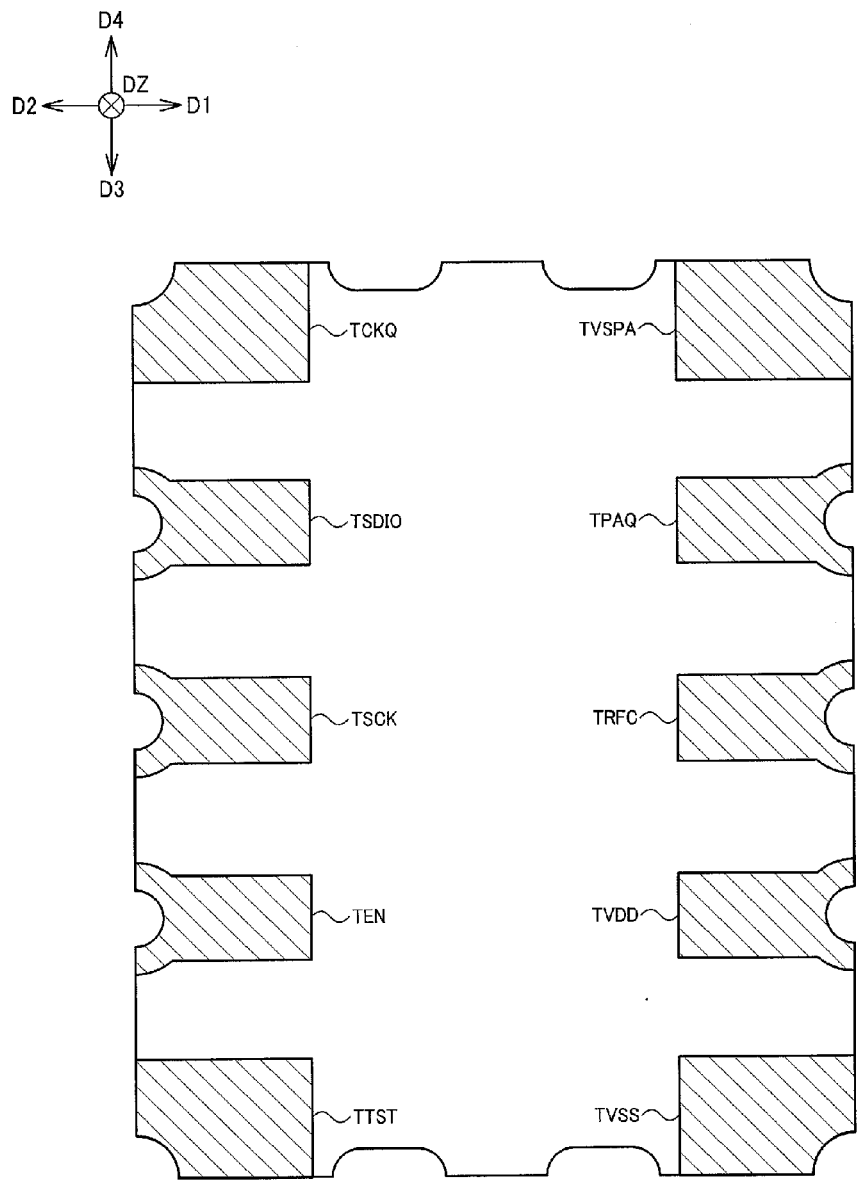
FIG. 8 is a diagram illustrating a detailed configuration example of the package in which the vibration piece and the semiconductor device are mounted.

FIGS. 6 to 8 illustrate a detailed configuration example of the package 10 into which the vibration piece 30 and the semiconductor device 20 are mounted. FIG. 6 is a plane diagram when the package 10 is viewed from above (in the direction DZ), and is a plane diagram in a state where an upper lid of the package 10 is opened. FIG. 7 is a cross-sectional diagram when the package 10 is viewed from the second direction D2. FIG. 8 is a plane diagram when the package 10 is viewed from below (the direction opposite to the direction DZ).

The direction DZ here is a direction that intersects the first to fourth directions D1 to D4, and, when the package 10 is mounted on a circuit substrate, is equivalent to the normal direction to a surface of the circuit substrate.

As illustrated in FIG. 6, provided within the package 10 are a first wire group WG1 that connects the analog pad PANA and the analog terminal TANA to each other, a second wire group WG2 that connects the digital pad PDG and the digital terminal TDG to each other, and a third wire group WG3 that connects the vibration piece 30 and the vibration piece pads PXG and PXD.

Specifically, the first wire group WG1 connects the analog pads PVSS, PVDD, PRFC, PPAQ, and PVSPA of the semiconductor device 20 and analog electrode pads SVSS, SVDD, SRFC, SPAQ, and SVSPA that are provided in the package 10, to each other. Furthermore, the second wire group WG2 connects digital pads PTST, PEN, PSCK, PSDIO, and PCKQ of the semiconductor device 20 and digital electrode pads STST, SEN, SSCK, SSDIO, and SCKQ, which are provided in the package 10, to each other.

With inside-package wiring in the package 10, these analog electrode pads SVSS, SVDD, SRFC, SPAQ, and SVSPA, and these digital electrode pads STST, SEN, SSCK, SSDIO, and SCKQ are connected to the analog terminals TVSS, TVDD, TRFC, TPAQ, and TVSPA and the digital terminals TTST, TEN, TSCK, TSDIO, and TCKQ, respectively.

Furthermore, the vibration piece 30 and the vibration piece pads PXG and PXD are connected to each other with the third wire group WG3 and the inside-package wiring in the package 10.

That is, as illustrated in FIG. 7, the third wire group WG3 connects the vibration piece pads PXG and PXD of the semiconductor device 20 and first vibration piece electrode pads SXG and SXD that are provided in the package 10, to each other. With the inside-package wiring, the first vibration piece electrode pads SXG and SXD are connected to second vibration piece electrode pads SXG2 and SXD2 that are provided in the package 10, to each other. Then, with a conductive adhesive, the second vibration piece electrode pads SXG2 and SXD2 and a terminal of the vibration piece 30 are connected to each other.

According to the embodiment describe above, the first wire group WG1 for analog faces outward from the first outer edge HS1 of the semiconductor device 20 and is connected to an electrode pad of the package 10, and the second wire group WG2 for digital faces outward from the second outer edge HS2 of the semiconductor device 20 and is connected to an electrode pad of the package 10. Accordingly, a bonding wire for analog and a bonding wire for digital are separated a distance away from each other in opposite directions. Furthermore, the package wiring lines, each of which connects an electrode pad that is a wiring destination, and the electrode pad and the terminal, are also respectively provided in locations which are positioned farther away from each other with digital and analog.

Furthermore, the third wire group WG3 for the vibration piece faces outward from the third outer edge HS3 of the semiconductor device 20 and is connected to an electrode pad of the package 10. Accordingly, a bonding wire for the vibration piece is separated from the bonding wire for analog (wires do not intersect each other, but wire directions are directions that intersect each other), and the package wiring that connects an electrode pad that is a wiring destination, and the electrode pad and the terminal, is also separated from the electrode pad or the package wiring for analog.

In this manner, a configuration is provided in which an analog signal, a digital signal, and a signal of the vibration piece are separated outward from the semiconductor device 20, and a configuration is provided in which it is exceedingly difficult for the coupling between the analog signal and the digital signal inside of and outside of the package 10 to occur.

Furthermore, by providing the inside-package wiring for connecting the vibration piece 30 and the vibration piece pads PXG and PXD, the semiconductor device 20 and the vibration piece 30 are arranged within the package 10 in an efficient manner, and thus the miniaturization of the package 10 (a reduction in mounting area) can be realized. Specifically, as described below, it is possible to make a three-dimensional arrangement within the package 10.

That is, as described in FIGS. 6 and 7, the vibration piece 30 is arranged in the package 10 in such a manner that the vibration piece 30 is superimposed on the semiconductor device 20 when the package 10 is viewed from above.

Specifically, an arrangement is made in such a manner the vibration piece 30 and the semiconductor device 20 are different from each other in the height (a position in the direction DZ) from the bottom of the package 10 and the vibration piece 30 does not come into contact with the semiconductor device 20. In FIG. 7, it is possible for the vibration piece 30 to vibrate in the direction DZ. The determination of to what extent the vibration piece 30 is superimposed on the semiconductor device 20 when viewed from above is arbitrary. However, as illustrated in FIG. 6, the vibration piece 30 may be superimposed on one portion of the semiconductor device 20, and the vibration piece 30 may be superimposed on all portions of the semiconductor device 20. Furthermore, basically, one portion of the vibration piece 30 is superimposed on the semiconductor device 20, but the superimposition is not limited to this.

A difference in the height at which the vibration piece 30 and the semiconductor device 20 is realized by formation of a sheet made of ceramics. For example, a sheet SST1, that is, a first layer, on which the semiconductor device 20 is installed, is provided, a sheet SST2, that is, a second layer, in the form of a frame that surrounds the semiconductor device 20, is provided on the first layer, a sheet SST3, that is, a third layer, is provided on the first layer, and the vibration piece 30 is installed on the sheet SST3, that is, the third layer. First electrode pads SXD and SXG for the vibration piece, for example, are provided on the sheet SST2, that is, the second layer, and the inside-package wiring is provided from the first electrodes pads SXD and SXG to a second electrode pads SXD2 and SXG2 on the sheet SST3, that is, the third layer.

As described above, it is possible for the vibration piece 30 to be superimposed on the semiconductor device 20 when viewed from above, the vibration piece 30 can be integrated into one package, and the mounting area of the package 10 can be decreased. Furthermore, although the vibration piece 30 is internally installed, the wiring between the vibration piece 30 and the semiconductor device 20 is simple (less guidance is provided), and this contributes to the suppression of the crosstalk within the package 10. Furthermore, by integrating the vibration piece 30 into one package, there is no need to provide wiring through which an oscillation signal passes, on the mounting substrate. Because the longer the wiring, the more the radiation from the wiring tends to be increased, the more the transfer of the oscillation signal over short wiring within the package 10 contributes to the reduction in the noise that is radiated from the wiring over which the oscillation signal is transferred.

Moreover, in the package 10, an inspection terminal (not illustrated) of the vibration piece 30 may be provided on a side HK3 of a third package.

For example, the inspection terminal that is connected, with the inside-package wiring, to the electrode pad (for example, SXD2, and the like) for the vibration piece may be provided on a side of the third package, which faces a flank side of the package 10. In this case, it is possible to test (for example, check an amplitude, a frequency, or the like) an oscillation signal from the inspection terminal, as an oscillation of the oscillation circuit. Alternatively, a signal that passes through any circuit (for example, a buffer, a frequency divider, or the like) within the semiconductor device 20 may be connected to the inspection terminal, without directly picking up the oscillation signal.

5. Configuration Example of the System

Figure 9:
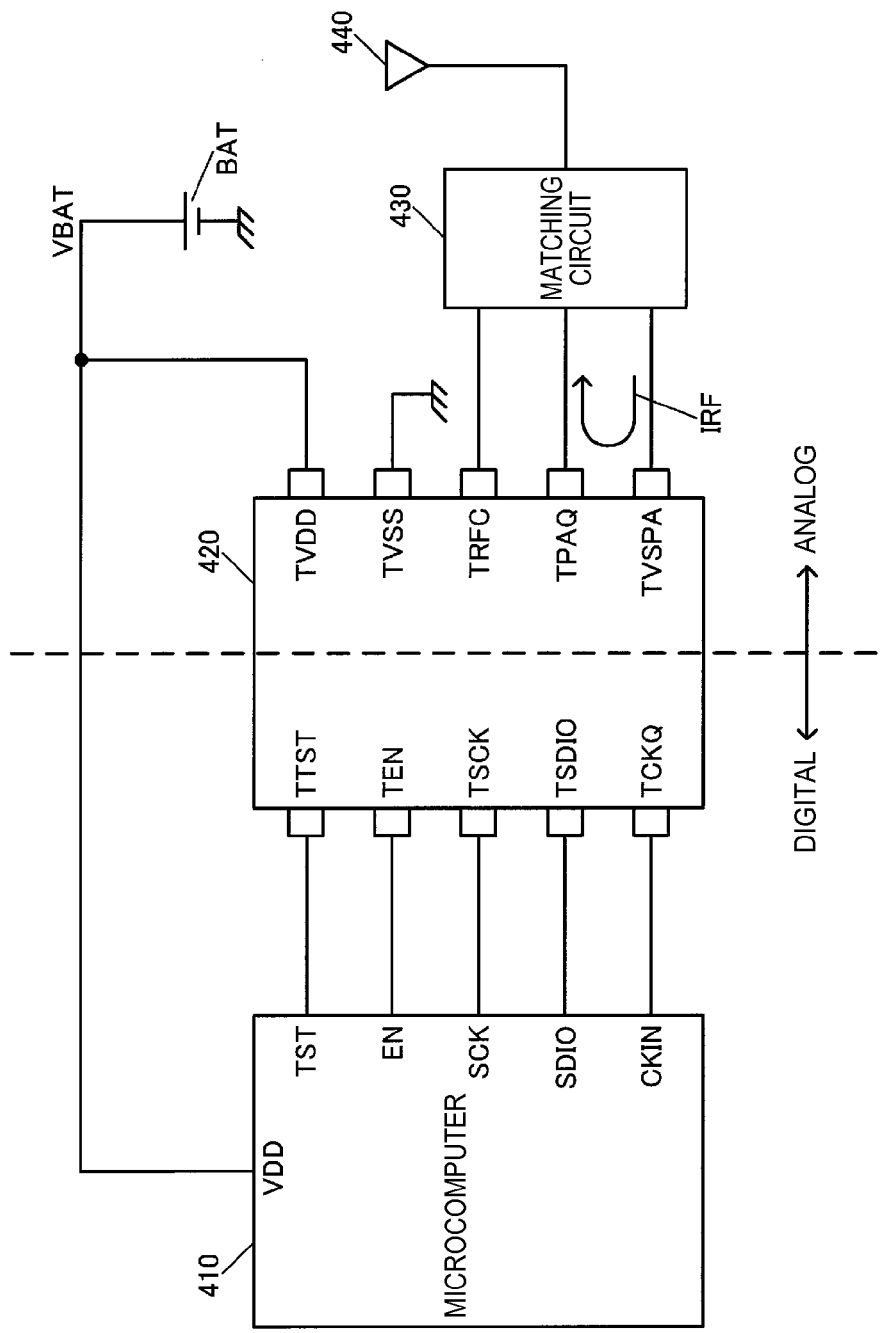
FIG. 9 is a diagram illustrating a configuration example of a system to which the wireless communication device according to the present embodiment is applied.

FIG. 9 illustrates a configuration example of a system to which the wireless communication device according to the present embodiment is applied, which is described above. The system in FIG. 9 includes the microcomputer 410, the wireless communication device 420, the matching circuit 430, the antenna 440, and a battery BAT (a power source, or a dry cell). The system, for example, is a wireless transmitter (an RF transmitter).

Configurations of, or operations by the microcomputer 410, the matching circuit 430, and the antenna 440 are the same as the configurations of or the operations by the microcomputer MC, the matching circuit IMT, and the antenna ANN in the comparative example in FIG. 1, and thus descriptions thereof are omitted for convenience.

Digital terminals TTST, TEN, TSCK, TSDIO, and TCKQ of the wireless communication device 420 are terminals that are connected to an external control controller.

In an example in FIG. 9, the external controller for control is the microcomputer 410. That is, the external controller for control is a digital processing circuit that performs processing of, or input and output of a digital signal (a signal representing any one of two values, that is, a H level and an L level), and is a controller (a host controller) that supplies communication data to the wireless communication device 420 and performs wireless communication.

As illustrated in FIG. 9, the microcomputer 410 is internally built in such a manner that the microcomputer 410 faces a side (the side HK2 of the second package) on which the digital terminal of the wireless communication device 420 is provided. On the other hand, the matching circuit 430 or the antenna 440 (for example, a pattern antenna (that is formed with a wiring pattern of a printed substrate) is internally built in such a manner that the matching circuit 430 or the antenna 440 faces a side (the side HK1 of the first package) on which the analog terminal of the wireless communication device 420.

Such a mounting arrangement is possible by separating the digital terminal and the analog terminal in such a manner that they are respectively separately positioned on two sides. That is, the semiconductor device 20 within the wireless communication device 420 and components on the mounting substrate other than the package are clearly separated into the digital portion and the analog portion (into a left portion and a right portion in FIG. 9). The wiring on the mounting substrate is connected to the digital terminal on a side that the microcomputer 410 faces, and is contested to the analog terminal on a side the matching circuit 430 faces, and thus the guidance of the wiring on the mounting substrate is exceedingly simple. As described above, regardless of the condition in which it is normally easy for the crosstalk due to the miniaturization to occur, according to the present embodiment, a wireless communication system can be set up in which there is little room for the crosstalk between digital and analog to occur.

Furthermore, in the comparative example in FIG. 1, the wiring of a clock terminal CKOUT and the wiring of a wireless transmission terminal GNDPA are adjacent to each other, and this is a cause of the reference leak. In this respect, according to the present embodiment, because the digital and the analog are completely separated from each other, wiring of a clock terminal TCKQ and wiring of wireless transmission terminals TRFC, TPAQ, and TVSPA are not in close proximity to each other. Accordingly, the reference leak can be expected to be suppressed, and a design to comply with the laws for the wireless communication can be expected to be made easy.

Furthermore, the wireless communication device 420 according to the present embodiment is arranged in such a manner that a terminal TPAQ for wireless output and a GND terminal TVSPA for wireless output are adjacent to each other.

When the wireless transmission is performed, for example, as with an electric current IRF that is illustrated in FIG. 9, an electric current that flows through wiring of the terminal TPAQ for wireless output and an electric current that flows through wiring of the GND terminal TVSPA for wireless output are opposite in electric-current flowing direction. In this case, a magnetic field due to an electric current is strong between two wiring lines, and is cancelled at portions other than the two wiring lines. That is, when a loop that is formed with the two wiring lines is short, an amount of radiation due to vibration of the electric current IRF can be small, and radiation that occurs at portions other than the antenna 440 can be suppressed. According to the present embodiment, because two terminals are adjacent to each other, the loop can be made to be short.

Furthermore, such a loop is a type of antenna, and there is a likelihood that the wireless communication device 420 and the like will absorb the digital noise that occurs. When the loop is short, there is a low likelihood that the digital noise will be absorbed, and the digital noise can be prevented from being sent out from the antenna 440, as unnecessary radiation. As the digital noise, the oscillation signal and the like are considered as one example. However, unnecessary radiation from the oscillation signal is decreased by building the vibration piece 30 into the package, and in conjunction with the short loop, this is expected to be useful for suppression of the reference leak.

6. Detailed Circuit Configuration of the Semiconductor Device

Figure 10:
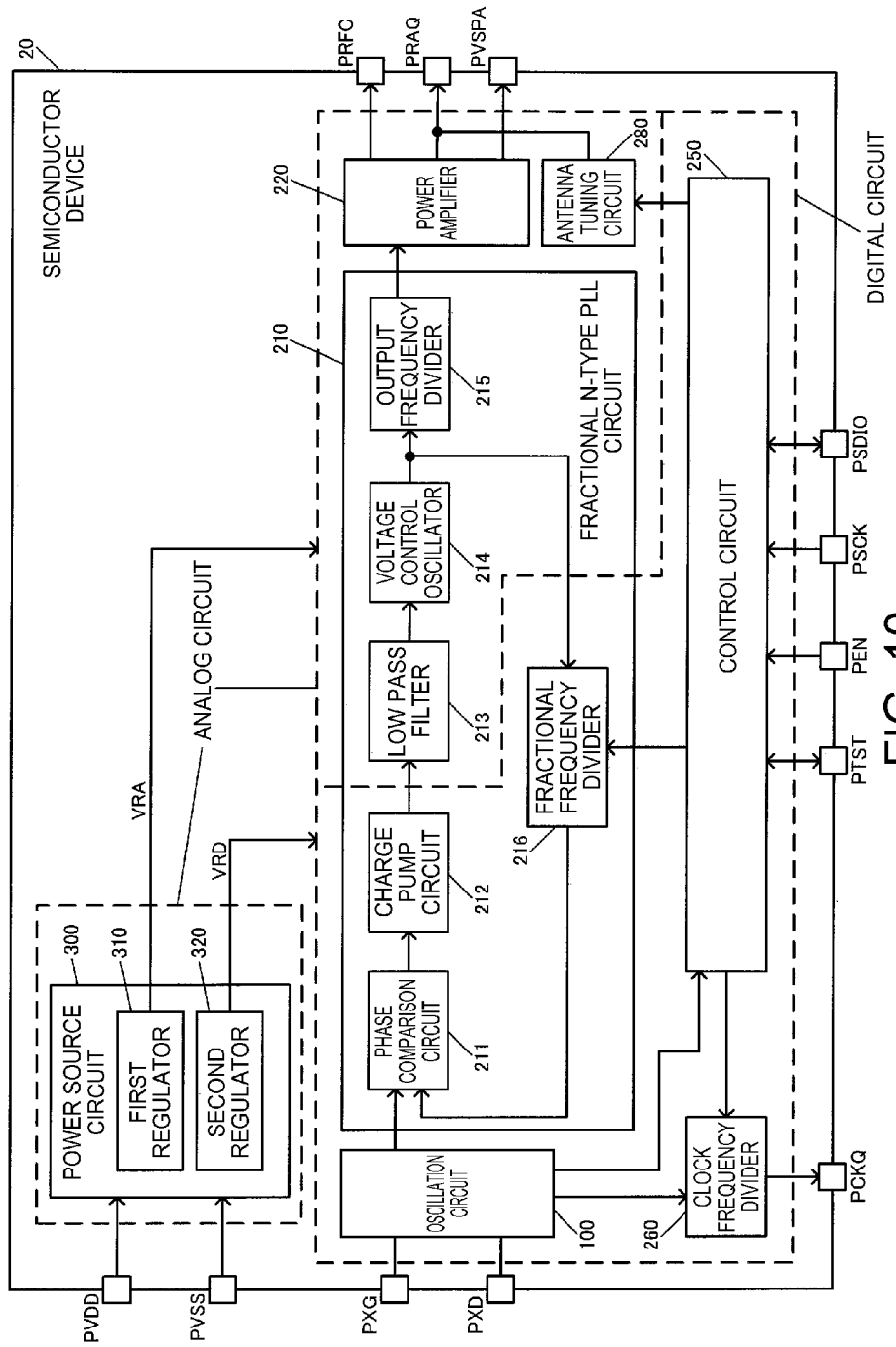
FIG. 10 is a functional block diagram illustrating a detailed configuration example of the semiconductor device.

FIG. 10 is a functional block diagram of a detailed configuration example of the semiconductor device 20. The semiconductor device 20 includes the oscillation circuit 100 of the vibration piece, and a wireless communication circuit that performs wireless communication processing based on the oscillation signal from the oscillation circuit 100. The wireless communication circuits the fractional N-type PLL circuit 210, the power amplifier 220, a control circuit 250, and an antenna tuning circuit 280. Furthermore, the semiconductor device 20 includes a clock frequency divider 260 and the power source circuit 300.

The fractional N-type PLL circuit 210 generates the carrier wave signal by performing the fractional multiplication (including the integer multiplication) of the oscillation signal, as the reference clock signal, from the oscillation circuit 100, modulates the carrier wave signal, and generates the wireless transmission signal.

Specifically, the fractional N-type PLL circuit 210 includes a phase comparison circuit 211, a charge pump circuit 212, a low pass filter 213, a voltage control oscillator 214 (VCO), an output frequency divider 215, a fractional frequency divider 216 (a feedback frequency divider).

The phase comparison circuit 211 compares a phase of a PLL oscillation signal that is fed back through the fractional frequency divider 216 with a phase of the reference clock, and outputs the voltage signal based on a difference between the phases. The charge pump circuit 212 converts the voltage signal from the phase comparison circuit 211 into an electric current signal. The low pass filter 213 converts the electric current signal from the charge pump circuit 212 into a voltage signal and perform low pass filter processing. The voltage control oscillator 214 produces oscillation at a frequency in accordance with a voltage value from the low pass filter 213. The fractional frequency divider 216 frequency-divides the PLL oscillation signal from the voltage control oscillator 214 at a fractional (an integer+a decimal) frequency division ratio. With the fractional frequency division, the fractional multiplication of the reference clock is possible.

The fractional frequency division ratio, for example, is determined as follows. That is, the fractional frequency divider 216 has a frequency divider that switches multiple integer frequency division ratios, and a delta sigma modulator. The delta sigma modulator generates a switch signal using delta signal modulation in such a manner that an average value is a desired fraction. For example, if (N frequency division and N+1 frequency division) is switched to 1:1, a fractional frequency division ratio of (N+0.5) is obtained as an average.

The output frequency divider 215 frequency-divides the PLL oscillation signal from the voltage control oscillator 214, and outputs a result of the division as a wireless transmission signal. That is, a frequency of the signal that is output by the output frequency divider 215 is a carrier wave frequency.

The antenna tuning circuit 280 is a circuit for maximizing (optimizing) output power of the wireless transmission signal. For example, because production variation is present in the semiconductor device 20, an individual difference occurs in the output power that is present when the connection to the antenna is established, but the antenna tuning circuit 280 adjusts (for example, adjusts in the manufacturing process) the individual difference. The antenna tuning circuit 280 is configured from a variable capacity and the like, and a capacity value of the variable capacity is adjusted in such a manner that the output power of the wireless transmission signal is maximized. Moreover, the antenna tuning circuit 280 may be omitted.

There is a need to modulate the carrier wave described above in performing the wireless communication, but for example modulation is performed as follows. That is, the control circuit 250 receives transmission data from the microcomputer 410, and modulates the frequency division ratio of the fractional frequency divider 216 based on the transmission data. Because in this manner the oscillation frequency (multiplication ratio) of a PLL is modulated, the wireless communication is possible with so-called FSK modulation.

According to the embodiment described above, by using the fractional N-type PLL circuit 210, even with the crystal vibration piece having the same oscillation frequency, it is possible to generate multiple frequency carrier waves with the fractional multiplication. Accordingly, frequencies necessary to respective purposes and respective countries can be obtained even with a single frequency vibration piece, and thus it is possible to integrate the vibration piece 30 and the semiconductor device 20 into one package.

However, the more the device is miniaturized with one packaging, the more difficult it is to remove the crosstalk between the digital and the analog. In this respect, according to the present embodiment, a circuit area or a pad, and a terminal are separated to be arranged in different sides, that is, one for the digital and the other for the analog, respectively, and a configuration is provided in which it is difficult for the crosstalk between the digital and the analog inside of and outside of the package 10 to occur. In this manner, according to the present embodiment, both of the one package and the suppression of the crosstalk can be realized.

Next, the power source circuit 300 is described. Based on a power source voltage that is supplied from an external system power source (for example, a battery or the like) of the semiconductor device 20, the power source circuit 300 generates a power source voltage that is used within the semiconductor device 20. Specifically, the power source circuit 300 includes a first regulator 310 that supplies a power source voltage VRA for analog to an analog circuit, and a second regulator 320 that supplies a power source voltage VRD for digital to a digital circuit.

The first regulator 310 and the second regulator 320, for example, are linear regulators that step down the power source voltage from the system power source. The power source voltage VRA for analog is supplied over a first power line from the first regulator 310 to the analog circuit. Furthermore, the power source voltage VRD for digital is supplied over a second power line from the second regulator 320 to the digital circuit. The first power line and the second power line are separated wiring lines.

In a case where, for example, voltage fluctuation due to operation of a digital circuit such as the oscillation circuit 100 occurs in the power source voltage VRD for digital and the voltage fluctuation is coupled to the power source voltage VRA for analog, in some cases, such trembling is transferred to an analog signal through the analog circuit and is a digital noise of the analog signal. Furthermore, in a case where, for example, voltage fluctuation due to operation of an analog circuit such as the power amplifier 220 occurs in the power source voltage VRA for analog and the voltage fluctuation is coupled to the power source voltage VRD for digital, in some cases, such trembling is transferred to the oscillation circuit 100 or the vibration piece 30 and is a cause of the error in the oscillation frequency.

In this respect, according to the present embodiment, the first regulator 310 for analog and the first power source line, and the second regulator 320 for digital and the second power source line are separated from each other, and thus the power source voltage VRA for analog and the power source voltage VRD for digital are electrically separated from each other. Accordingly, the crosstalk (noise coupling) between the digital and the analog, in which the power source voltage (a power source line) is involved can be suppressed. Particularly, the vibration piece 30 or the oscillation circuit 100 and the power amplifier 220 is considered to be a large occurrence source of a noise, and a considerable influence is given from the point of view of the reference leak or the error in the oscillation frequency. According to the present embodiment, a mutual bad influence of the vibration piece 30 or the oscillation circuit 100 and the power amplifier 220 on each other can be reduced.

More particularly, the first regulator 310 supplies the power source voltage VRA for analog to the low pass filter 213, the voltage control oscillator 214, the output frequency divider 215, and the power amplifier 220. Furthermore, the second regulator 320 supplies the power source voltage VRD for digital to the phase comparison circuit 211, the charge pump circuit 212, the fractional frequency divider 216, the oscillation circuit 100, the control circuit 250, and the clock frequency divider 260.

That is, according to the present embodiment, the low pass filter 213, the voltage control oscillator 214, the output frequency divider 215, the power amplifier 220, the antenna tuning circuit 280, and the power source circuit 300 are categorized into the analog circuit. Furthermore, the phase comparison circuit 211, the charge pump circuit 212, the fractional frequency divider 216, the oscillation circuit 100, the control circuit 250, and the clock frequency divider 260 are categorized under the digital circuit.

This categorization can suppress the crosstalk between the digital and the analog, and is particularly effective at suppressing the reference leak. A noise source of the reference leak is a circuit that operates at the reference clock, and each of the units that are categorized as the digital circuit is equivalent to this. In other words, in the fractional N-type PLL circuit 210, the phase comparison circuit 211, the charge pump circuit 212, and the fractional frequency divider 216 performs digital operation at a frequency of the reference clock (or a clock that results from frequency-dividing the reference clock). First, by separating power sources for these constituent elements from the analog circuit, the reference leak in which the power source is involved is suppressed.

Furthermore, even if the noise of the reference clock is coupled in the front portion of the low pass filter 213, it is possible to cut off the reference leak by lowering a cut off frequency of the low pass filter 213 much more than the frequency of the reference clock. However, in a case where the noise of the reference clock is coupled in the rear portion of the low pass filter 213, a filter is not further present in the rear portion, and it is exceedingly difficult to remove the reference leak. In this respect, according to the present embodiment, the rear portion of the low pass filter 213 is categorized under the analog circuit and is separated in power source from the digital circuit. Accordingly, the crosstalk in which the power source is involved can be prevented from occurring in the rear portion of the low pass filter 213 in which it is difficult to remove the reference leak.

Because the crosstalk in which the power source is involved passes through a substrate, as well as a power source line and is coupled to the analog circuit, the crosstalk has a great influence over a wide range. For this reason, by performing the categorization described above and separating the power sources, the reduction in the reference leak can be realized exceedingly effectively compared with a case where power source separation is not performed.

Moreover, the output frequency divider 215 performs the digital operation, but is an analog constituent element in the sense that when the digital noise is coupled to the output frequency divider 215, the digital noise rides on a wireless analog output. That is, the analog circuit and the digital circuit are defined considering an influence of the crosstalk on the analog signal, not depending on whether the operation is simply digital or analog.

7. Detailed Layout Configuration of the Semiconductor Device

Figure 11:
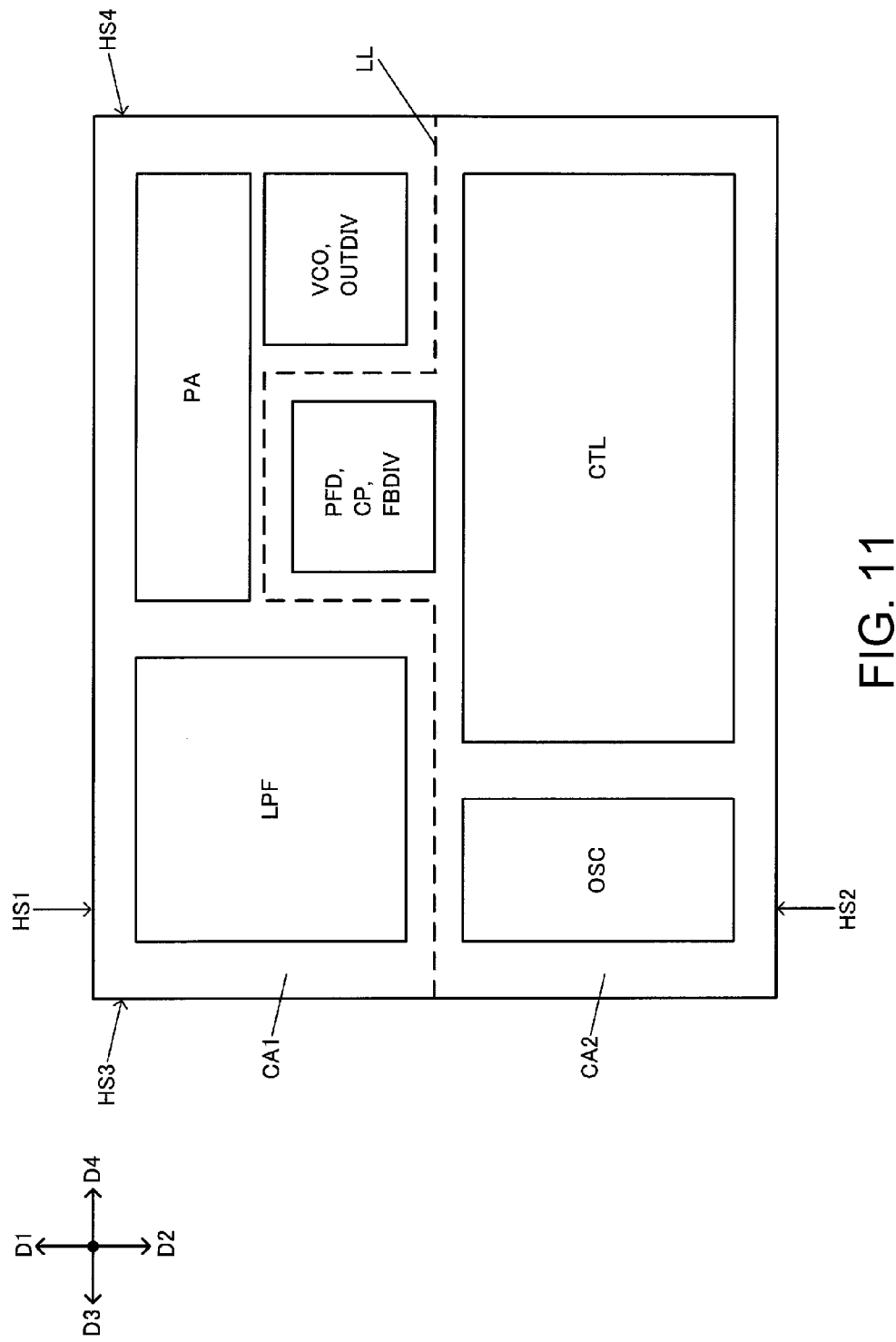
FIG. 11 is a diagram illustrating a detailed layout configuration example of the semiconductor device.

FIG. 11 illustrates a detailed layout configuration of the semiconductor device 20 in the configuration example described above.

The first circuit area CA1 on the first outer edge HS1 side includes an area VCO in which the voltage control oscillator 214 is arranged, an area OUTDIV in which the output frequency divider 215 is arranged, the area PA in which the power amplifier 220 is arranged, and an area LPF in which the low pass filter 213 is arranged.

Furthermore, the second circuit area CA2 on the second outer edge HS2 side includes an area PFD in which the phase comparison circuit 211 is arranged, an area CP in which the charge pump circuit 212 is arranged, an area FBDIV in which the fractional frequency divider 216 is arranged, the area OSC in which the oscillation circuit 100 is arranged, and an area CTL in which the control circuit 250 is arranged. Moreover, for example, components other than the control circuit 250, such as a memory, may be arranged in the area CTL.

As described referring to FIG. 5, the power amplifier 220 (PA) and the oscillation circuit 100 (OSC) are arranged to be diagonally separated from each other. In the first circuit area CA1, the low pass filter 213 (LPF) is arranged in the third direction D3 (the third outer edge HS3) when viewed from the power amplifier 220. Furthermore, the voltage control oscillator 214 and the output frequency divider 215 (VCO and OUTDIV) is arranged in the second direction DC2 (on the second outer edge HS2 side) when viewed from the power amplifier 220. In the second circuit area CA2, the control circuit 250 (CTL) is arranged in the fourth direction D4 (on the fourth outer edge HS4 side) when viewed from the oscillation circuit 100. Furthermore, the phase comparison circuit 211, the charge pump circuit 212, and the fractional frequency divider 216 (PFD, CP, and FBDIV) are arranged in the first direction D1 (on the first outer edge HS1 side) when viewed from the control circuit 250.

A border line LL between the first circuit area CA1 and the second circuit area CA2 is a line that goes around the areas PFD, CP, and FBDIV. The border line LL is not limited to one straight line, and the border line LL may be a line that intersects the third outer edge HS3 and the fourth outer edge HS4 and does not come into contact with the first outer edge HS1 and the second outer edge HS2.

By making an arrangement as described above, the analog circuit and the digital circuit that results from the categorization in FIG. 10 can be also separated from each other on the layout. That is, the coupling between the digital and the analog, which runs in parallel with the wiring or passes through the substrate, is suppressed, and it is possible to suppress the reference leak or the error in the oscillation frequency.

Furthermore, because the low pass filter 213 is configured mainly from a passive element such as a capacitor or a resistor, it is considered that the low pass filter 213 is strongly resistant to sneaking of a noise from the substrate, compared to the power amplifier 220 or the voltage control oscillator 214, or the like. For this reason, in the first circuit area CA1, by arranging the power amplifier 220 or the voltage control oscillator 214 to be separated a greater distance from the oscillation circuit 100 than the low pass filter 213, a configuration is provided in which the digital noise resulting from the oscillation circuit 100 is not as coupled as possible to a wireless output.

8. Oscillation Circuit

Figure 12:
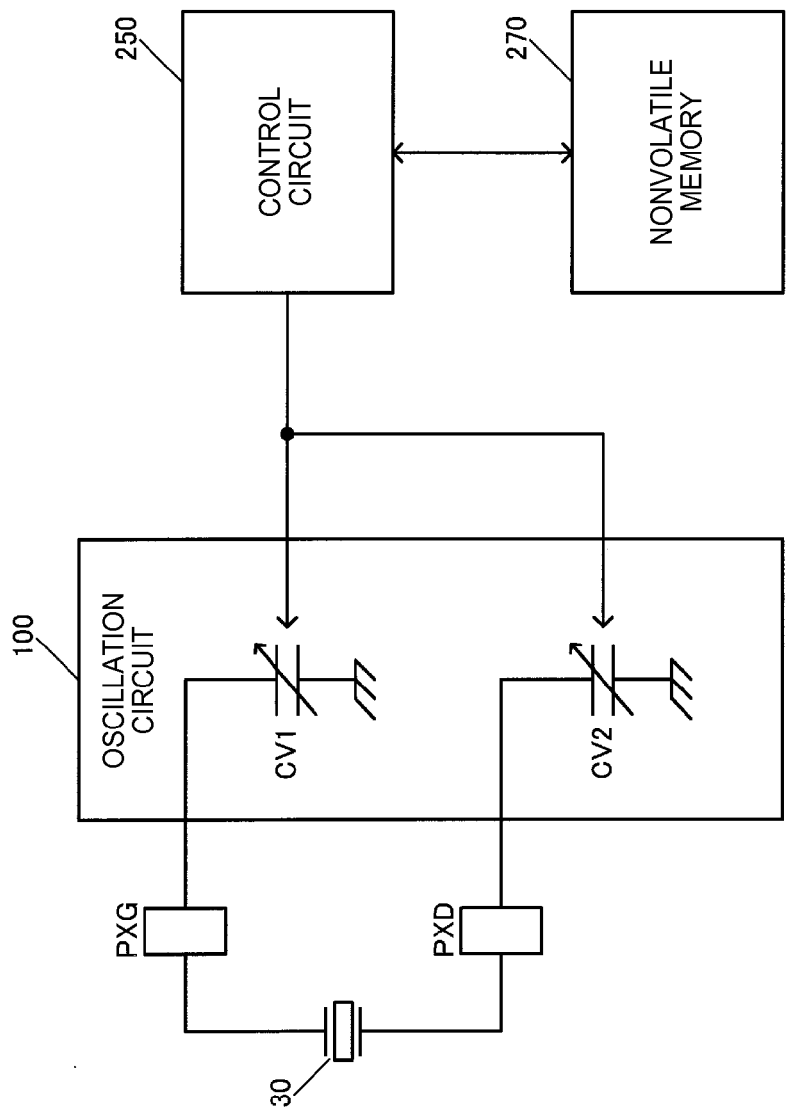
FIG. 12 is a diagram illustrating a detailed configuration example of an oscillation circuit.

FIG. 12 illustrates a detailed configuration example of the oscillation circuit 100. The oscillation circuit 100 includes variable capacities CV1 and CV2 for adjusting a frequency of the oscillation signal. Furthermore, in addition to the constituent elements in FIG. 10, the semiconductor device 20 includes non-volatile memory 270 (for example, an EEPROM or the like) in which setting values of the variable capacities CV1 and CV2 are stored.

The setting values stored in the non-volatile memory 270 are read by the control circuit 250, and the control circuit 250 controls capacity values of the variable capacities CV1 and CV2 based on the setting values. For example, the setting values of the variable capacities CV1 and CV2 are written to the non-volatile memory 270 when manufacturing the wireless communication device 420 (when testing the oscillation frequency).

As described above, according to the present embodiment, by integrating the vibration piece 30 and the semiconductor device 20 (the wireless communication IC) into one package, an ion beam radiates to the vibration piece 30 before closing a lid of the package 10, and thus the oscillation frequency can be adjusted.

According to the present embodiment, it is also possible to tune the oscillation frequency by adjusting the variable capacities CV1 and CV2 after sealing the package 10. Accordingly, the reference clock is obtained which has an exceedingly smaller number of errors than the reference clock in the related art, and the number of errors in the frequency of the carrier wave can be decreased. Then, in addition to this, it is possible to narrow the receiving bandwidth, and the receiving sensitivity can be increased. That is, although the transmission power is decreased, the wireless communication can be maintained at the same distance with the same sensitivity, and the power consumption can be reduced by decreasing the transmission power. In a portable-type wireless system, generally, a small-sized dry cell or a battery is used, and it is important to reduce power consumption.

As described above, the mounting of the fractional N-type PLL circuit 210 and the integration of the vibration piece 30 into one package can not only miniaturize the device but also realize a reduction in power consumption in the wireless communication.

Moreover, although there is an error in the oscillation frequency of the crystal vibration piece, by adjusting a frequency division ratio of the fractional N-type PLL circuit 210, it is not impossible to decrease the number of errors in the frequency of the carrier wave. However, considering that there is a need to adjust the frequency division ratio in order to handle an individual crystal vibration piece, that in order to create multiple carrier wave frequencies, the frequency division ratio is changed or the frequency division ratio is used for modulation, and other factors, it is not realistic to perform individual adjustment of the frequency division ratio. In this respect, according to the present embodiment, the number of errors in the oscillation frequency of the crystal vibration piece can be decreased.

9. Power Amplifier

Figure 15:
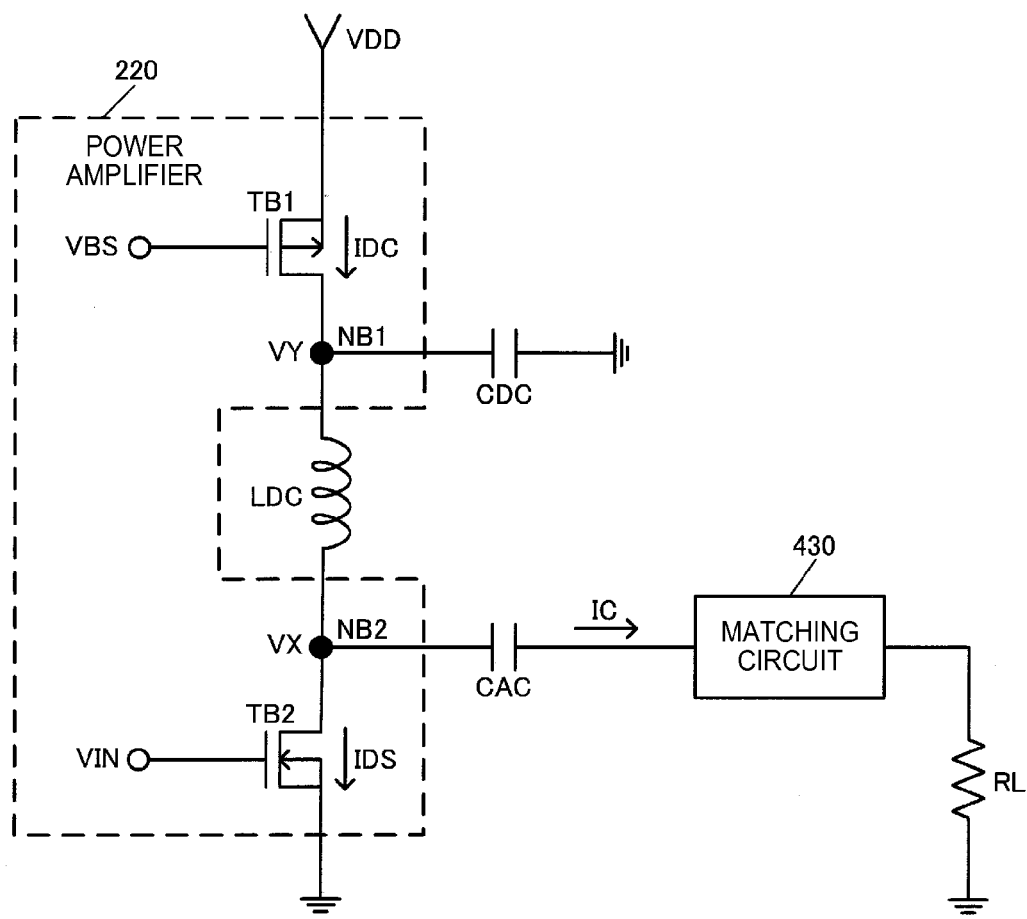
FIG. 15 is a diagram illustrating a detailed configuration example of a power amplifier.

FIG. 15 illustrates a detailed configuration of the power amplifier 220. The power amplifier 220 includes an electric current source and a drive unit. The electric current source, for example, is configured from a P-type (a first conductivity-type in a broad sense) transistor TB1 (a MOS transistor). The drive unit, for example, is configured from a N-type (a second conductivity-type in a broad sense) drive transistor TB2 (a MOS transistor).

A node NB1 that is connected to a drain of the transistor TB1 is a node that is connected to the pad PRFC of the semiconductor device 20. Furthermore, a drive node NB2 that is connected to a drain of the drive transistor TB2 is a node that is connected to a pad PRAQ of the semiconductor device 20. Furthermore, a ground voltage node that is connected to the source of the drive transistor TB2 is a node that is connected to the pad PVSPA of the semiconductor device 20.

A voltage VBS (a bias voltage) is input into a gate of the transistor TB1, and a constant electric current IDC flows through the transistor TB1. With the electric current source, a voltage VY of the node NB1 is made to be equivalent to a voltage of a power source VDD. A capacitor CDC is a capacitor for stabilizing fluctuation in potential of the voltage VY that is equivalent to a voltage of the power source VDD. A choke coil LDC keeps down pulsation of an electric current IDC that results when the drive transistor TB2 is turned on or off. That is, the choke coil LDC also functions as a constant current source.

An input signal VIN that corresponds to a transmission input signal is input into the drive transistor TB2. The input signal VIN is a rectangular wave that oscillates at a frequency of a wireless signal. When the drive transistor TB2 is turned on, the electric current IDS flows to the ground side through the drive transistor TB2. The electric current IDC from the electric current source is a constant electric current, and a relationship that is expressed as IDC=IDS+IC is established. For this reason, the drive transistor TB2 is turned on or off by an input signal VIN, and thus a flow path for the electric current IDC is switched, and an alternating electric current IC is made to flow to the matching circuit 430 side (a load side). Moreover, RL indicates a load (load resistance) that is equivalent to the antenna 440 in FIG. 9.

Moreover, the electric current source and the drive unit are described above as being configured from the transistor TB1 and the drive transistor TB2, respectively, but are not limited to this. For example, the electric current source may be configured in such a manner that the electric current IDC can be adjusted to a variable one and the drive unit may be configured in such a manner that the drive unit can make an adjustment to a drive force in accordance with such a variable electric current IDC. For example, a configuration may be provided in which switching to two steps, that is, a low power mode and a high power mode, is possible. In this case, for example, a second electric current source transistor is connected, in parallel, to the transistor TB1, and a second drive transistor is connected, in parallel, to the drive transistor TB2. Then, in the low power mode, the electric current IDC is supplied by the transistor TB1, and drive is performed by the drive transistor TB2. On the other hand, in the high power mode, the electric current IDC is supplied by the transistor TB1 and the second electric current source transistor, and the drive is performed by the drive transistor TB2 and the second drive transistor. For example, in the low power mode, the electric current to be supplied can be adjusted in a range of 0 mA to 0.8 mA, and in the high power mode, the electric current to be supplied can be adjusted in a range of 0 mA to 14 mA.

10. Vibration Piece

Figures 16A, 16B:
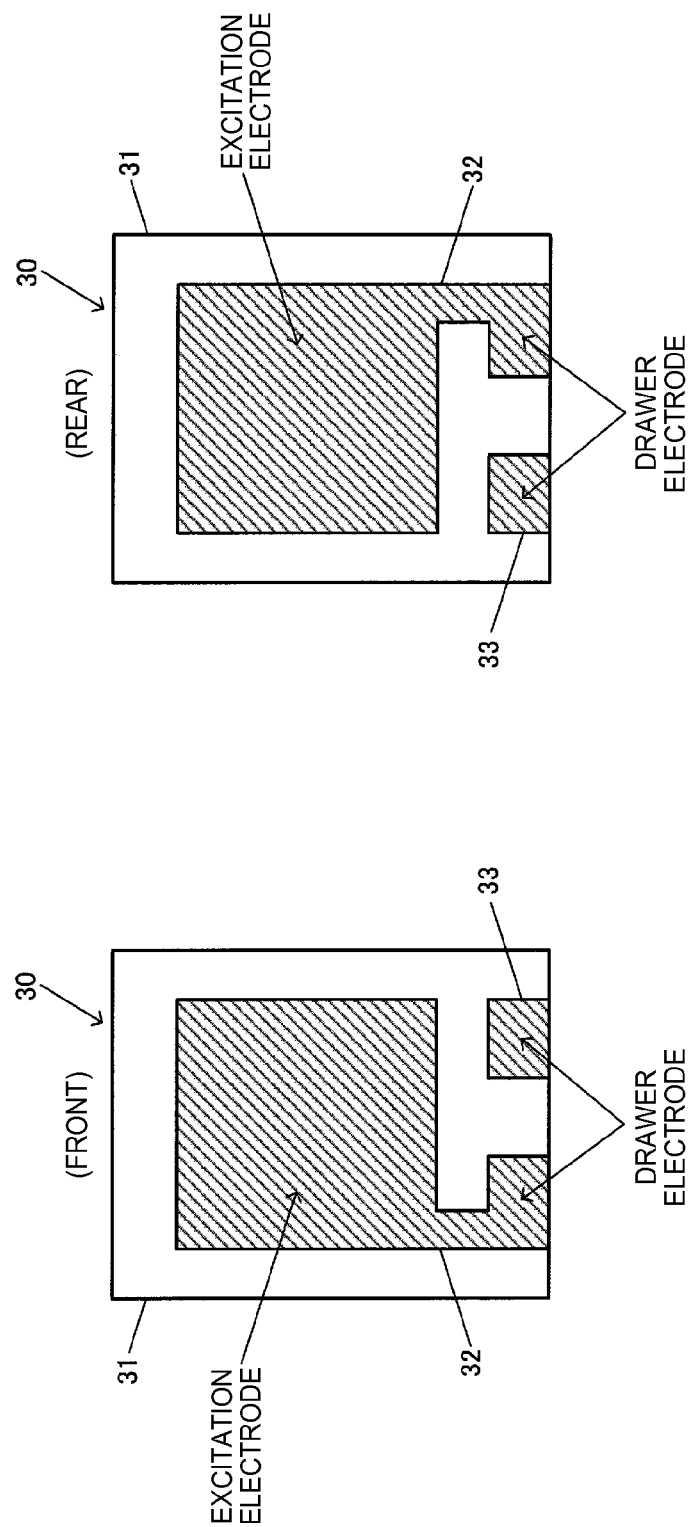
FIGS. 16A and 16B are diagrams illustrating a detailed configuration example of the vibration piece.

FIG. 16A is a plane diagram illustrating the vibration piece 30 when viewed from the front. FIG. 16B is a plane diagram illustrating the vibration piece 30 when viewed from the rear. The front surface of the vibration piece is a surface that is a lid side (a side that is seen when the lid is opened, and a side in the direction DZ in FIG. 7) of the package 10 in a case where the vibration piece 30 is mounted in the package 10. The rear surface of the vibration piece is a surface that is a mounting surface side (a rear surface side on which a terminal is provided, and a side in the negative direction DZ in FIG. 7) of the package 10 in the case where the vibration piece 30 is mounted in the package 10.

The vibration piece 30 includes an AT cut-type crystal 31 (a crystal piece, a piezoelectric element piece) and a first electrode 32, and a second electrode 33. The first electrode 32 and the second electrode 33 are configured from conductive members, for example, such as metals, and are provided on both of the front and rear surfaces of the AT cut-type crystal 31. The first electrodes 32 and the second electrodes 33 that are provided on the front and rear surfaces are connected to each other on a flank side of the AT cut-type crystal 31. The first electrode 32 is configured from an excitation electrode for applying an excitation voltage to the AT cut-type crystal 31 and a drawer electrode for establishing a connection to the electrode pad of the package 10. The excitation electrode is configured in such a manner that the excitation electrode widely covers, for example, the middle portion of the AT cut-type crystal 31 in a manner that forms a rectangle. The second electrode 33 is configured from the drawer electrode for establishing the connection to the electrode pad of the package 10. The drawer electrodes of the first electrode 32 and the second electrode 33 are connected to the electrode pad of the package 10 on the rear surface of the vibration piece 30.

11. Electronic Apparatus

Figure 13:
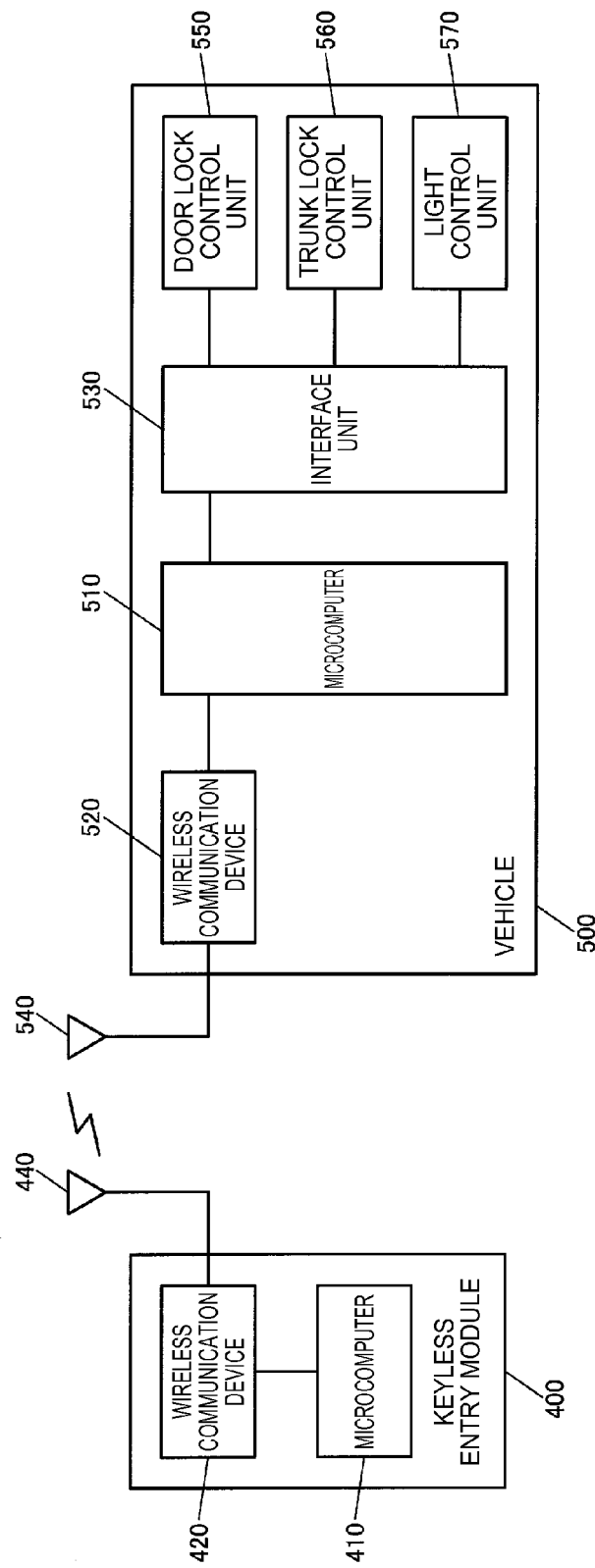
FIG. 13 is a diagram illustrating a configuration example of a system including an electronic apparatus.

FIG. 13 illustrates a system configuration example including an electronic apparatus to which the wireless communication device according to the present embodiment is applied. A keyless entry system including a keyless entry module is described below with the keyless entry module being taken as an example of the electronic apparatus, but the electronic apparatus is not limited to this. It is possible to apply the wireless communication device according to the present embodiment to various electronic apparatuses.

The keyless entry system includes a keyless entry module 400 (an electronic apparatus) and a vehicle body 500. The keyless entry module 400 includes the antenna 440 for transmission, the wireless communication device 420 (a wireless transmission device) that transmits a wireless radio wave through the antenna 440, and the microcomputer 410 that controls a wireless transmission. The vehicle body 500 includes an antenna 540 for reception, a wireless communication device 520 (a wireless receiving device or a RF receiver) that receives the wireless radio wave through the antenna 540, a microcomputer 510 that controls processing and the like based on wireless reception or received data, an interface unit 530 that connects to the microcomputer 510 and each unit of the vehicle body 500, door lock control unit 550 that controls locking and unlocking of a vehicle door, a trunk lock control unit 560 that controls locking and unlocking of a vehicle trunk, and a light control unit 570 that controls switching-on, switching-off, switching-on and -off, and the like of light (for example, a blinker light or a headlight, or the like).

A button not illustrated and the like are provided in the keyless entry module 400, and when a user operates the button, the vehicle body 500 side is notified of such operational information through the wireless communication. Then, the microcomputer 510 interprets the operational information, performs unlocking or locking of the vehicle door or the vehicle trunk, or performs switching-on and -off of a blinker light and the like in order to notify the user of the unlocking or locking.

12. Moving Object

Figure 14:
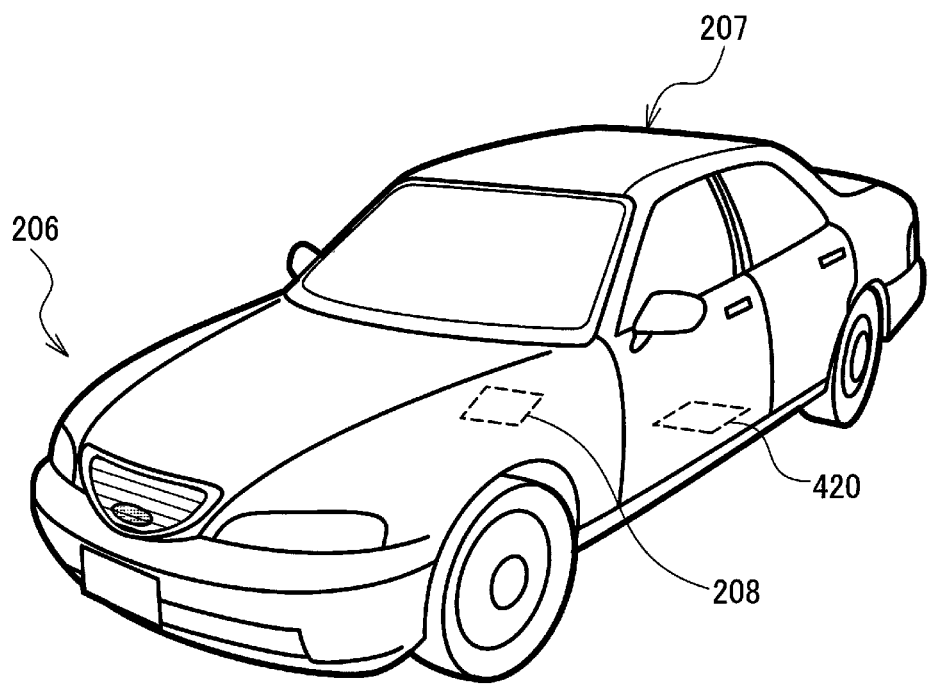
FIG. 14 is a diagram illustrating a configuration example of a moving object.

FIG. 14 illustrates an example of a moving object including the wireless communication device 420 according to the present embodiment. The wireless communication device 420 according to the present embodiment can be built into various moving objects, for example, such as a vehicle, an airplane, a motorbike, a bicycle, or a vessel. The moving object is an instrument or apparatus that, for example, includes a drive mechanism, such as an engine or a motor, a steering mechanism, such as a steering wheel or a rudder, and various electronic apparatuses, and that moves, flies, or sails.

FIG. 14 schematically illustrates a vehicle 206 as a specific example of the moving object. The wireless communication device 420 that has the vibration piece 30 and the semiconductor device 20, and an electronic control unit (ECU) 208 that controls each unit (for example, an engine, an brake, an air conditioner, and electronic window, or the like) of the vehicle 206 are built into the vehicle 206. Separate wireless communication devices are connected to the ECU 208 as well, and the ECU 208 performs control of the vehicle 206 based on information received from the wireless communication device 420. Alternatively, control information is transmitted from the ECU 208 to the wireless communication device 420, and operation of an apparatus that is connected to the wireless communication device 420 is controlled. For example, any sensing signal such as room temperature may be acquired and may be transmitted from the wireless communication device 420 to the ECU 208. Alternatively, an instruction such as one to unlock the door may be transmitted from the ECU 208 to the wireless communication device 420. Harnessless communication is possible by using such wireless communication, and communication that overcomes the problem with a moving unit in which a harness installation operation is difficult, omission of the harness installation in a manufacturing process, or the like is made possible.

Moreover, the description is provided in detail according to the present embodiment, but a person of ordinary skill in the art can easily understand that many modifications which do not substantially deviate from new matters or effects according to the invention are possible. Therefore, such modification examples are all included within a scope of the invention. For example, in the specification or the drawings, the terms (for example, a power amplifier) that are described at least once together with different terms that have broader meaning or the same meaning can be exchanged with the different terms (for example, an amplifier), in any place of the specification or the drawings. Furthermore, all combinations of the present embodiment and the modification example are also included in the scope of the invention. Furthermore, configurations of and operations by the vibration piece, the semiconductor device, the package, the wireless communication device, the electronic apparatus, the moving object, and the like are not limited to those described according to the present embodiment, and it is possible to make various modifications.

The entire disclosure of Japanese Patent Application No. 2014-147880, filed Jul. 18, 2014 is expressly incorporated by reference herein.

What is claimed is:

1. A wireless communication device comprising:
   a vibration piece that is plate shaped and has a surface;
   an excitation electrode provided on the surface of the vibration piece;
   a semiconductor device that is connected to the vibration piece, the semiconductor device including:
      an oscillation circuit which causes the vibration piece to oscillate so as to generate an oscillation signal; and a wireless communication circuit having an amplifier, the amplifier being configured to amplify a wireless signal which is generated based on the oscillation signal;

a package that houses the vibration piece and the semiconductor device, wherein the excitation electrode is laterally shifted from the amplifier in a plan view.

2. The wireless communication device according to claim 1, wherein the semiconductor device is rectangular shaped and has first, second, third and fourth corners, and the semiconductor device has:

a first outer edge that extends in a first direction;

a second outer edge that extends in a second direction which is parallel to the first direction;

a third outer edge that extends in a third direction which intersects the first and second directions; and a fourth outer edge that extends in a fourth direction which is parallel to the third direction and intersects the first and second directions, wherein the amplifier is arranged closer to the fourth outer edge than the third outer edge, and wherein the oscillation circuit is arranged closer to the third outer edge than the fourth outer edge.

3. The wireless communication device according to claim 2, wherein the semiconductor device is configured with first, second, third and fourth sub areas in the plan view that are connected to each other at a center of the semiconductor device, each of the first through fourth sub areas is rectangular shaped, the first sub area has the first corner that is formed by the first and third outer edges, the second sub area has the second corner that is formed by the first and fourth outer edges, the third sub area has the third corner that is formed by the second and third outer edges, the fourth sub area has the fourth corner that is formed by the second and fourth outer edges, wherein the second corner of the second sub area are located opposite to the third corner of the third sub area with respect to the center of the semiconductor device, and the oscillation circuit is arranged in the third sub area, and the amplifier is arranged in the sub second area.

4. The wireless communication device according to claim 2, wherein the amplifier is arranged closer to the first outer edge than the second outer edge, and the oscillation circuit is arranged closer to the second outer edge than the first outer edge.

5. The wireless communication device according to claim 3, wherein the amplifier is arranged closer to the first outer edge than the second outer edge, and the oscillation circuit is arranged closer to the second outer edge than the first outer edge.

6. The wireless communication device according to claim 4, further comprising:

a fractional N-type phase locked loop circuit, wherein the fractional N-type phase looked loop circuit includes a phase comparison circuit, a charge pump circuit, a low pass filter, a voltage control oscillator, and a fractional frequency divider, and wherein the voltage control oscillator is arranged closer to the first outer edge than the second outer edge.

7. The wireless communication device according to claim 4, wherein the semiconductor device includes a first regulator that supplies a power source voltage for analog and a second regulator that supplies a power source voltage for digital, and wherein the first regulator supplies the power source voltage for analog to the amplifier and the second regulator supplies the power source voltage for digital to the oscillation circuit.

8. The wireless communication device according to claim 7, further comprising:

a first power source line; and a second power source line that is separated from the first power source line, wherein the power source voltage for analog is supplied from the first regulator to the amplifier over the first power source line, and wherein the power source voltage for digital is supplied from the second regulator to the oscillation circuit over the second power source line.

9. The wireless communication device according to claim 6, wherein the semiconductor device includes a first regulator that supplies a power source voltage for analog and a second regulator that supplies a power source voltage for digital, and wherein the first regulator supplies the power source voltage for analog to the voltage control oscillator and the amplifier, and the second regulator supplies the power source voltage for digital to the oscillation circuit, the phase comparison circuit, the charge pump circuit, and the fractional frequency divider.

10. The wireless communication device according to claim 9, wherein the semiconductor device includes a first power source line and a second power source line that is separated from the first power source line, wherein the power source voltage for analog is supplied from the first regulator to the voltage control oscillator and the amplifier over the first power source line, and wherein the power source voltage for digital is supplied from the second regulator to the oscillation circuit, the phase comparison circuit, the charge pump circuit, and the fractional frequency divider over the second power source line.

11. The wireless communication device according to claim 1, wherein the semiconductor device is rectangular shaped, and the semiconductor has:

a first outer edge that extends in a first direction;

a second outer edge that extends in a second direction which is parallel to the first direction;

a third outer edge that extends in a third direction which intersects the first and second directions; and wherein in the semiconductor device, an analog pad that is connected to the amplifier is provided directly adjacent to the first outer edge, and a vibration piece pad that is connected to the vibration piece is provided directly adjacent to the third outer edge.

12. The wireless communication device according to claim 2, wherein in the semiconductor device, an analog pad that is connected to the amplifier is provided directly adjacent to the first outer edge, and a vibration piece pad that is connected to the vibration piece is provided directly adjacent to the third outer edge.

13. The wireless communication device according to claim 3,
   wherein in the semiconductor device, an analog pad that is connected to the amplifier is provided directly adjacent to the first outer edge, and a vibration piece pad that is connected to the vibration piece is provided directly adjacent to the third outer edge.

14. The wireless communication device according to claim 11,
   wherein the vibration piece and the vibration piece pad are electrically connected via a wire located in the package.

15. The wireless communication device according to claim 12,
   wherein the vibration piece and the vibration piece pad are electrically connected via a wire located in the package.

16. The wireless communication device according to claim 13,
   wherein the vibration piece and the vibration piece pad are electrically connected via a wire located in the package.

17. An electronic apparatus comprising:
   the wireless communication device according to claim 1.

18. A moving object comprising:
   the wireless communication device according to claim 1.

* * * * *